United States Patent
Baek et al.

(10) Patent No.: US 12,137,367 B2
(45) Date of Patent: *Nov. 5, 2024

(54) METHOD AND APPARATUS FOR PROCESSING DATA FOR PACKET DUPLICATION

(71) Applicant: Samsung Electronics Co., Ltd., Suwon-si (KR)

(72) Inventors: Sangkyu Baek, Yongin-si (KR); Anil Agiwal, Suwon-si (KR); Hyunjeong Kang, Seoul (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,816

(22) Filed: Jul. 10, 2023

(65) Prior Publication Data

US 2023/0354084 A1    Nov. 2, 2023

Related U.S. Application Data

(63) Continuation of application No. 17/486,761, filed on Sep. 27, 2021, now Pat. No. 11,700,542, which is a
(Continued)

(30) Foreign Application Priority Data

Mar. 23, 2017  (KR) .................. 10-2017-0036822
Jun. 14, 2017  (KR) .................. 10-2017-0075075
Sep. 28, 2017  (KR) .................. 10-2017-0126578

(51) Int. Cl.
*H04W 28/02*    (2009.01)
*H04L 1/1607*   (2023.01)
(Continued)

(52) U.S. Cl.
CPC ....... *H04W 28/0263* (2013.01); *H04L 1/1614* (2013.01); *H04L 5/0098* (2013.01);
(Continued)

(58) Field of Classification Search
CPC ............. H04W 28/0263; H04W 28/06; H04W 28/0278; H04W 28/0252; H04W 80/02;
(Continued)

(56) References Cited

U.S. PATENT DOCUMENTS 8,605,674 B2    12/2013  Park et al.
9,264,930 B2    2/2016   Damnjanovic et al.
(Continued)

FOREIGN PATENT DOCUMENTS

CN    103201977 A    7/2013
GB      2570134 A    7/2019
(Continued)

OTHER PUBLICATIONS

Ericsson, "Data duplication in lower layers (HARQ)", 3GPP TSG-RAN WG2 #97, Feb. 13-17, 2017, Tdoc R2-1702032, 6 pages.
(Continued)

*Primary Examiner* — Ricardo H Castaneyra

(57) ABSTRACT

The present disclosure relates to a communication technique that fuses IoT technology with a 5G communication system to support a higher data transfer rate than a 4G communication system, and a system therefor. The present disclosure may be applied to intelligent services (e.g., smart homes, smart buildings, smart cities, smart cars or connected cars, health care, digital education, retailing, security and safety related services, etc.) on the basis of 5G communication technology and IoT related technology. The present disclosure relates to a 5G or pre-5G communication system for supporting a higher data transmission rate than a 4G communication system such as LTE. An embodiment of the
(Continued)

present invention relates to a method and a structure for processing data for packet duplication. According to the embodiment of the present invention, disclosed are a radio bearer setup method, a packet duplication operation, and a buffer status reporting method, which are for use in performing packet duplication.

18 Claims, 43 Drawing Sheets

Related U.S. Application Data continuation of application No. 16/496,940, filed as application No. PCT/KR2018/002264 on Feb. 23, 2018, now Pat. No. 11,140,571.

(51) Int. Cl.
| | | |
|---|---|---|
| *H04L 5/00* | (2006.01) | |
| *H04W 28/06* | (2009.01) | |
| *H04W 80/02* | (2009.01) | |
| *H04W 80/08* | (2009.01) | |

(52) U.S. Cl.
CPC ........... *H04W 28/06* (2013.01); *H04W 80/02* (2013.01); *H04W 80/08* (2013.01)

(58) Field of Classification Search
CPC .... H04W 80/08; H04W 76/15; H04L 1/1614; H04L 1/08; H04L 5/0098; H04L 5/0044
See application file for complete search history.

(56) References Cited

U.S. PATENT DOCUMENTS

| | | |
|---|---|---|
| 2010/0067454 A1 | 3/2010 | Lee et al. |
| 2012/0057560 A1 | 3/2012 | Park et al. |
| 2012/0281564 A1 | 11/2012 | Zhang et al. |
| 2015/0215987 A1 | 7/2015 | Kim et al. |
| 2016/0094446 A1 | 3/2016 | Kazmi et al. |
| 2016/0286412 A1 | 9/2016 | Kim et al. |
| 2019/0098606 A1 | 3/2019 | Sharma et al. |
| 2019/0268799 A1* | 8/2019 | Hong ..................... H04W 4/70 |
| 2020/0037151 A1 | 1/2020 | Du et al. |

FOREIGN PATENT DOCUMENTS

| | | |
|---|---|---|
| KR | 10-2010-0122054 A | 11/2010 |
| KR | 10-2016-0095203 A | 8/2016 |
| WO | 2005109778 A1 | 11/2005 |
| WO | 2015/065039 A1 | 5/2015 |

OTHER PUBLICATIONS

Huawei, HiSilicon, "Redundancy Schemes below PDCP Layer", 3GPP TSG-RAN2 Meeting #97, R2-1701201, 4 pages.
International Search Report dated Jun. 5, 2018 in connection with International Patent Application No. PCT/KR2018/002264, 10 pages.
Written Opinion of the International Searching Authority dated Jun. 5, 2018 in connection with International Patent Application No. PCT/KR2018/002264, 6 pages.
"3rd Generation Partnership Project; Technical Specification Group Radio Access Network; NR; Medium Access Control (MAC) protocol specification (Release 15)", 3GPP TS 38.321 v0.2.0 (Aug. 2017), 36 pages.
Supplementary European Search Report dated Feb. 10, 2020 in connection with European Patent Application No. 18 77 2600, 9 pages.
Intel Corporation, "Packet duplication for URLLC in DC and CA deployment", 3GPP TSG-RAN WG2 NR Ad-hoc, Jan. 17-19, 2017, R2-1700336, 3 pages.
China National Intellectual Property Administration, "The First Office Action," dated Sep. 28, 2022, in connection with Chinese Patent Application No. 201880020299.3, 25 pages.
Communication under Rule 71(3) EPC dated Oct. 30, 2023, in connection with European Patent Application No. 21191862.8, 99 pages.

* cited by examiner

BEARER CONFIGURATION SCHEME

DRB ID =6

DuplicationMode=True

LogicalChannelIdentity: 4

CC: 1, 2, 3

Correspondingnumerology: 15kHz, 30kHz

DuplicationType: Primary

NumberOfDuplication: 2

LogicalChannelIdentity: 5

CC: All

Correspondingnumerology: 15kHz

DuplicationType: Secondary

NumberOfDuplication: 1

FIG. 19
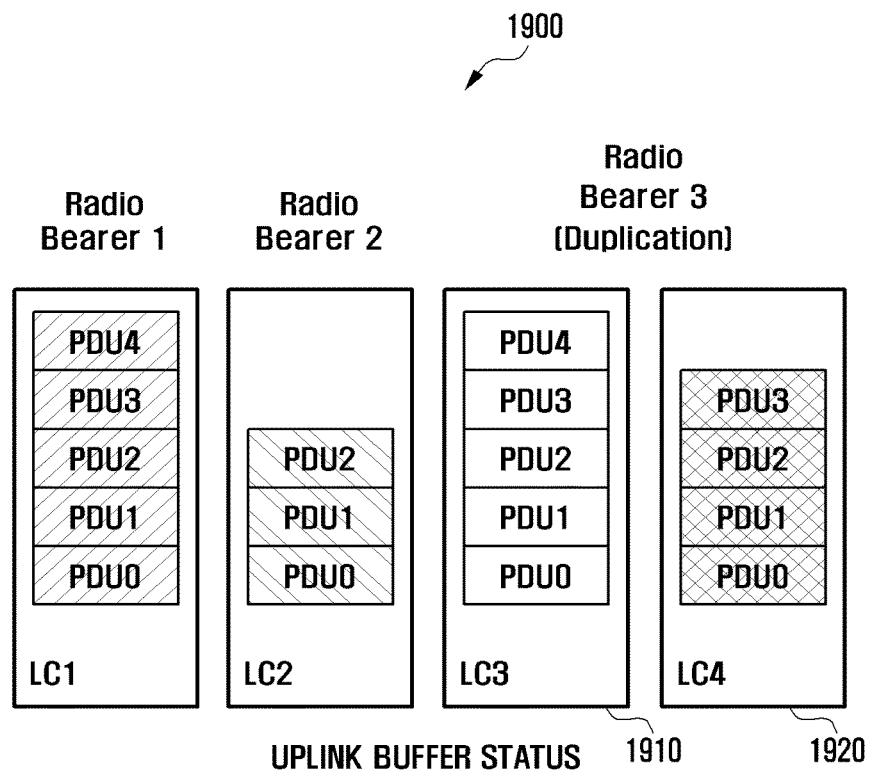
UPLINK BUFFER STATUS
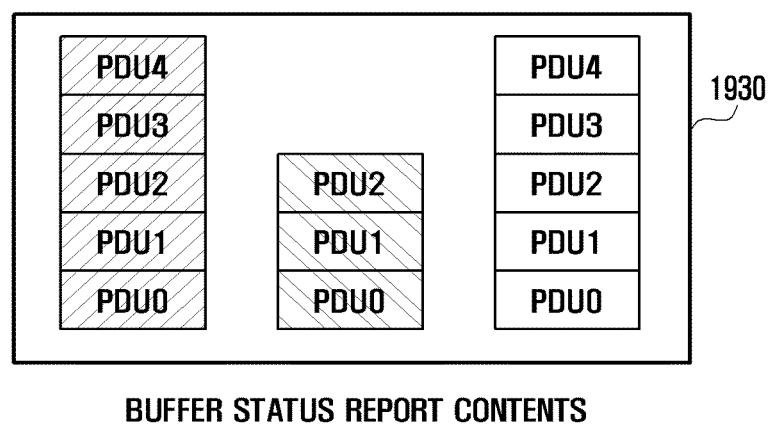
BUFFER STATUS REPORT CONTENTS FIG. 20
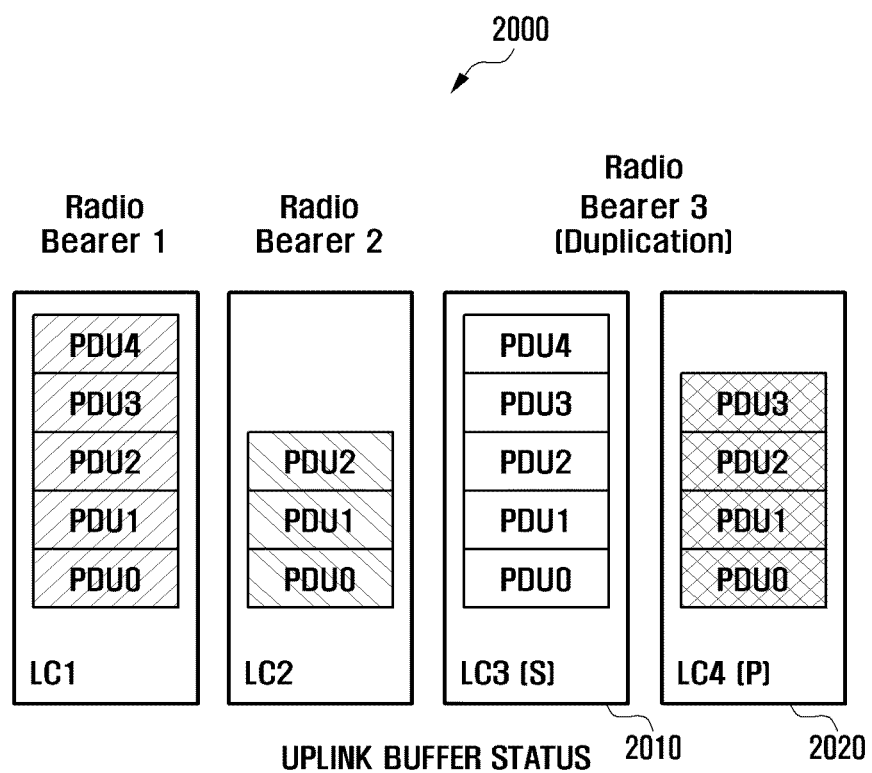
UPLINK BUFFER STATUS
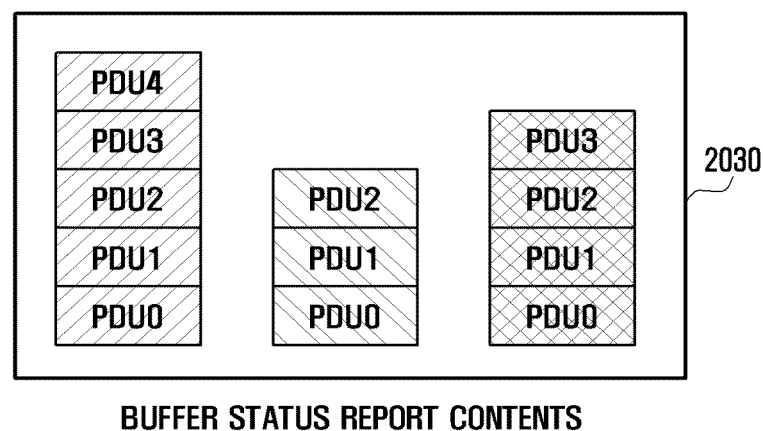
BUFFER STATUS REPORT CONTENTS FIG. 21
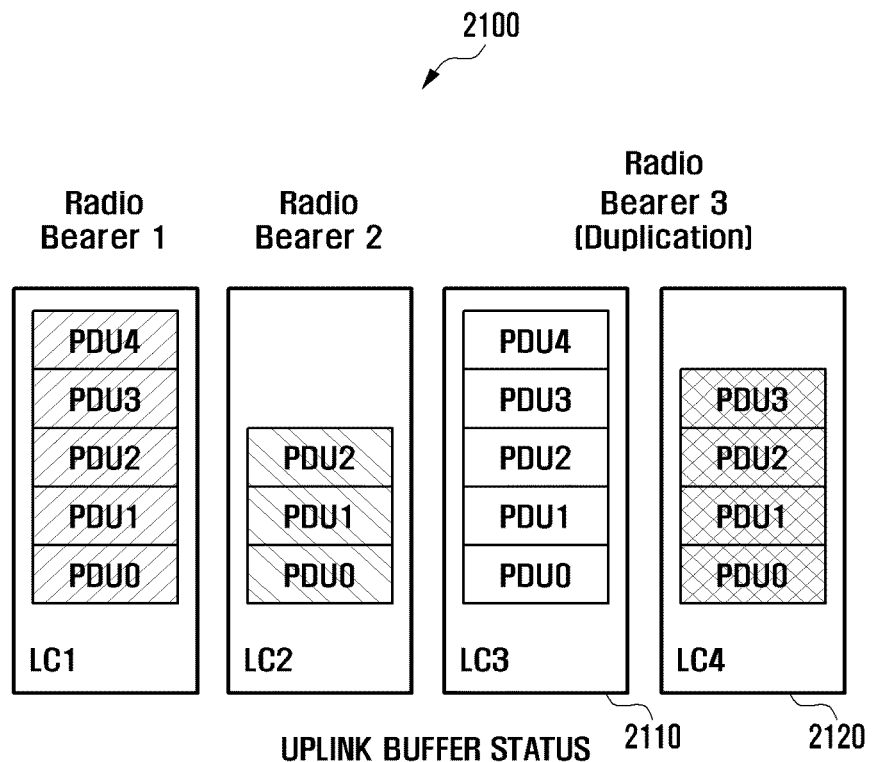
UPLINK BUFFER STATUS
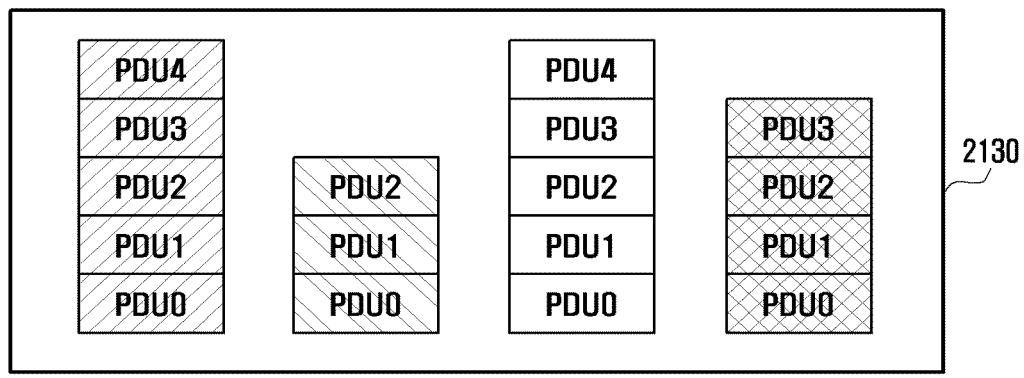
BUFFER STATUS REPORT CONTENTS

- RadioBearerID = 1
- DuplicationMode = True
- DuplicationIndex = 1
- NumberOfLegs = 2

- LogicalChannelID = 3
- DuplicationType = Primary
- CC = 1,2,3

- LogicalChannelID = 4
- DuplicationType = Secondary
- CC = 4,5

- RadioBearerID = 1
- DuplicationMode = True
- NumberOfLegs = 2

- LogicalChannelID = 3
- DuplicationType = Primary
- CC = 1,2,3
- DuplicationIndex = 1

- LogicalChannelID = 4
- DuplicationType = Secondary
- CC = 4,5
- DuplicationIndex = 2

METHOD AND APPARATUS FOR PROCESSING DATA FOR PACKET DUPLICATION

CROSS-REFERENCE TO RELATED APPLICATIONS

This application is a continuation of U.S. patent application Ser. No. 17/486,761 filed Sep. 27, 2021, now U.S. Pat. No. 11,700,542 issued Jul. 11, 2023, which is a continuation of U.S. patent application Ser. No. 16/496,940 filed Sep. 23, 2019, now U.S. Pat. No. 11,140,571 issued Oct. 5, 2021, which is a 371 of International Application No. PCT/KR2018/002264 filed on Feb. 23, 2018, which claims priority to Korean Patent Application No. 10-2017-0036822 filed on Mar. 23, 2017, Korean Patent Application No. 10-2017-0075075 filed on Jun. 14, 2017, and Korean Patent Application No. 10-2017-0126578 filed on Sep. 28, 2017, the disclosures of which are herein incorporated by reference in their entirety.

BACKGROUND

1. Field

The disclosure relates to a method and an apparatus for processing data for packet duplication and, more particularly to, a data structure for packet duplication.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post-LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mmWave band and increase a propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved from a human-oriented connection network in which humans generate and consume information, to an Internet of Things (IoT) network in which distributed components including things exchange and process information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as smart homes, smart buildings, smart cities, smart cars, connected cars, smart grids, health care, smart home appliances, or high-tech medical services through the convergence of the conventional Information Technology (IT) and various industries.

Accordingly, various attempts to apply the 5G communication system to the IoT network are being made. For example, 5G communication technologies, such as a sensor network, machine to machine (M2M) communication, machine type communication (MTC), and the like are implemented by technologies, such as beam forming, MIMO, and an array antenna. The application of a cloud RAN as the big data processing technology may be an example of convergence of the 5G technology and the IoT technology.

Meanwhile, in a packet-based mobile communication system, research on a method and a structure for processing data for packet duplication is required.

SUMMARY

A technical problem to be solved by an embodiment of the disclosure is to provide a method and apparatus for processing data for packet duplication and, more particularly to provide a data structure therefor.

A technical problem to be solved by the disclosure is to provide a radio bearer configuration scheme, a packet duplication operation, and a buffer status reporting scheme when performing packet duplication.

According to an embodiment of the disclosure, a method of a terminal in a mobile communication system may include: receiving, from a base station, information for mapping a logical channel to a component carrier (CC); and transmitting data packet processed in the logical channel, to the base station through the CC to which the logical channel has been mapped according to the information.

According to another embodiment of the disclosure, a terminal in a mobile communication system may include: a transceiver for transmitting or receiving a signal; and a controller configured to receive, from a base station, information for mapping a logical channel to a component carrier (CC), and transmit a data packet processed in the logical channel, to the base station through the CC to which the logical channel has been mapped according to the information.

According to still another embodiment of the disclosure, a method of a base station in a mobile communication system may include: transmitting, to a terminal, information for mapping a logical channel to a component carrier (CC): and receiving a data packet processed in the logical channel, from the terminal through the CC to which the logical channel has been mapped according to the information.

According to still another embodiment of the disclosure, a base station in a mobile communication system may include: a transceiver for transmitting or receiving a signal; and a controller configured to transmit, to a terminal, information for mapping a logical channel to a component carrier (CC), and receive a data packet processed in the logical channel, from the terminal through the CC to which the logical channel has been mapped according to the information.

The technical problems to be solved by the disclosure are not limited to the above mentioned technical subjects, and other technical subjects which are not mentioned herein may be clearly understood, through the following descriptions, by those skilled in the art of the disclosure.

An embodiment of the disclosure may provide a data processing method and structure for packet duplication. Further, according to an embodiment of the disclosure, it is possible to effectively perform duplicate transmission in a communication environment having multiple links.

BRIEF DESCRIPTION OF THE DRAWINGS

FIG. 19 illustrates transmission of an uplink buffer status report when packet duplication is performed according to an embodiment of the disclosure.

FIG. 20 illustrates transmission of an uplink buffer status report when packet duplication is performed according to another embodiment of the disclosure.

FIG. 21 illustrates transmission of an uplink buffer status report when packet duplication is performed according to another embodiment of the disclosure.

DETAILED DESCRIPTION

Figure 1:
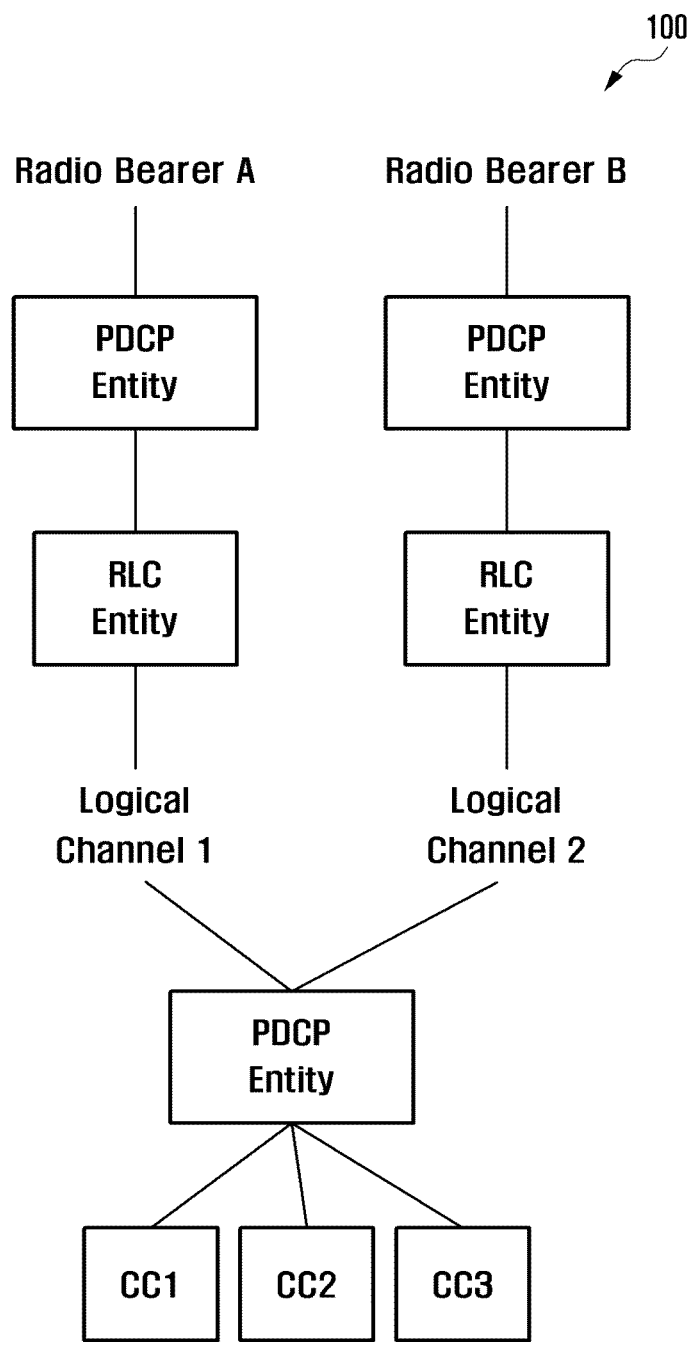
FIG. 1 illustrates a radio bearer structure in an LTE CA environment.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

In addition, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

FIG. 1 illustrates a radio bearer structure 100 in an LTE carrier aggregation (CA) environment. In LTE CA, data flow is processed for each bearer and data is mapped to one radio bearer. These radio bearers are mapped to logical channels on a one-to-one basis and these logical channels are multiplexed in a MAC layer and then transmitted. CA is a technology that uses a collection of various frequency resources by bundling various component carriers (CCs), wherein data having been multiplexed in the MAC layer is transmitted through one of CCs. FIG. 1 illustrates an embodiment in which radio bearers 1 and 2 each having a PDCP apparatus and an RLC device are mapped to logical channels #1 and #2, respectively. After these logical channels #1 and #2 are multiplexed in the MAC layer, and data is then transmitted through one of CCs 1, 2, and 3. Each logical channel or each radio bearer has no restriction in the number of CCs available for transmission therefor. Here, the CC may be recognized as one cell by a terminal, and may be configured as a primary cell (PCell) or secondary cell (SCell), and the same applies to the following description.

Figure 2:
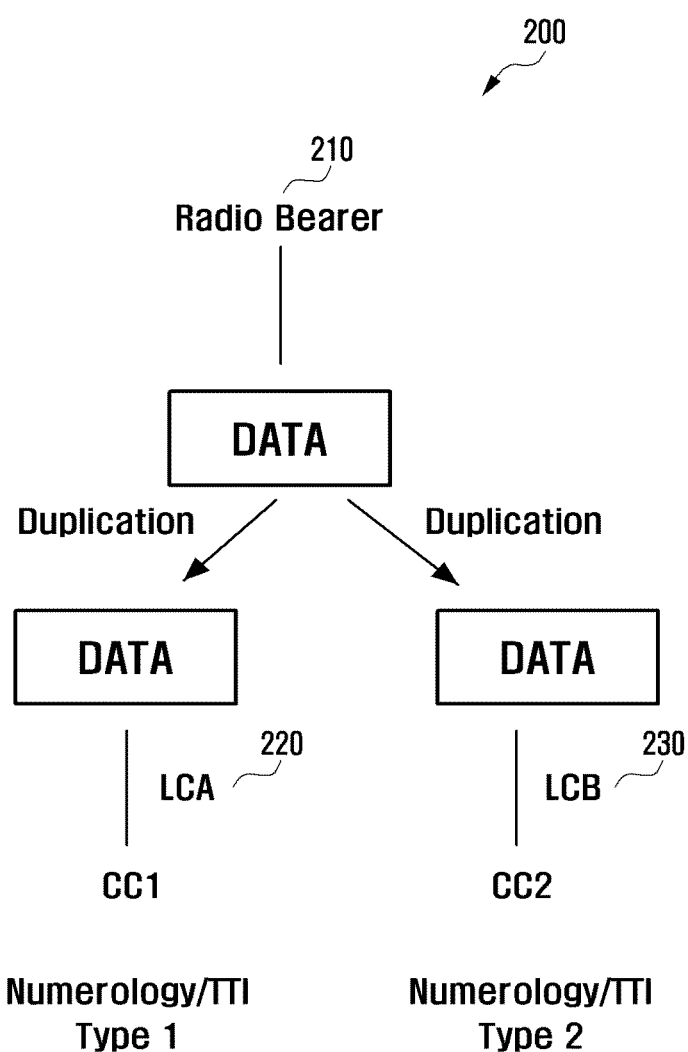
FIG. 2 illustrates a basic flowchart of a transmitter for performing packet duplication according to an embodiment of the disclosure.

FIG. 2 illustrates a basic flowchart 200 of a transmitter for performing packet duplication. When packet duplication is configured for a specific radio bearer 210, data processed by the radio bearer may perform a packet duplication procedure. Generally, the packet duplication procedure includes performing a process of data duplication and then transmitting the data through different logical channels. Here, data packets copied through packet duplication may be transmitted through different logical channels 220 and 230 respectively, transmitted to different splits in a split bearer environment respectively, transmitted through different CCs respectively, or transmitted in different numerologies or TTI types. An operation of copying a data packet through packet duplication is done by one of the PDCP, RLC, and MAC layers, which are data processing layers. Further, data used herein may be in the form of an IP packet processed by a user. In some embodiments, the data may be a control signal within a protocol, such as an RRC message.

Figure 3:
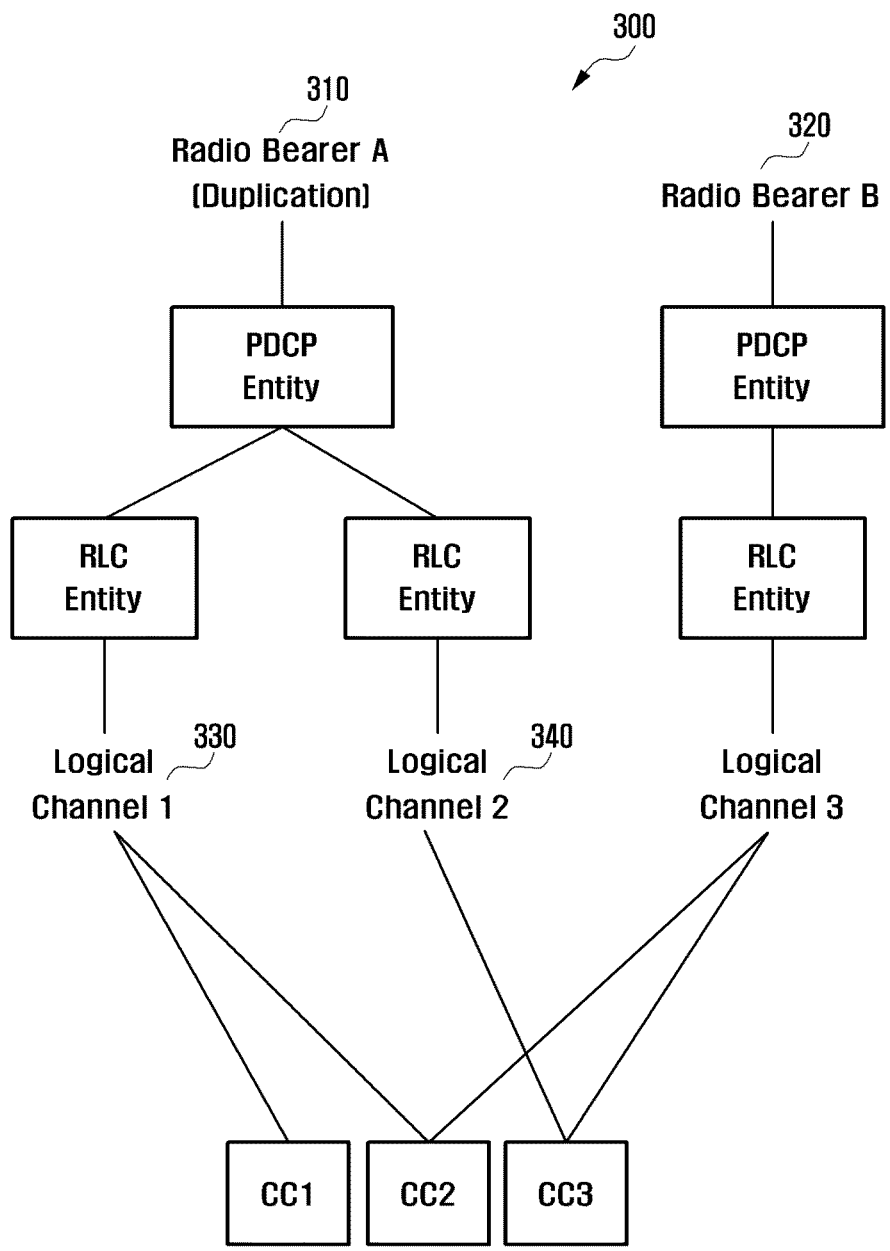
FIG. 3 illustrates a bearer structure for packet duplication according to an embodiment of the disclosure.

FIG. 3 illustrates an embodiment of a bearer structure 300 for packet duplication. In the embodiment illustrated in FIG. 3, the bearer structure includes radio bearer A 310 and radio bearer B 320. Generally, one or more signaling radio bearers (SRB) and data radio bearers may be provided between a base station and a terminal. The radio bearer A 310 is a bearer for which packet duplication is allowed, and radio bearer B 320 is a bearer for which packet duplication is not allowed. In the embodiment illustrated in FIG. 3, a process is shown such that a PDCP apparatus (or, entity) of radio bearer A 310 copies a PDCP protocol data unit (PDU), and transmits the copied PDCP PDUs to different RLC devices, respectively. RLC apparatuses are mapped to logical channels #1 and #2 (330 and 340), respectively. Radio bearer B 320 is mapped to one logical channel (logical channel #3) because packet duplication thereof is not allowed.

Here, in order to perform efficient packet transmission, mapping of a logical channel to a component carrier (CC) is required. In other words, by mapping a logical channel to a CC (that is, by establishing/defining a mapping relationship between a logical channel and a CC), it is possible to specify a limit for a CC that can transmit specific logical channel data. In a case of packet duplication, the main purpose thereof is to increase reliability and reduce latency by performing separate data processing of the copied packet and then transmitting the same. In order to effectively achieve this purpose, it is required that the copied data packets are transmitted through different CCs, respectively. In the embodiment illustrated in FIG. 3, logical channel #1 330 is mapped to CC1 and CC2 so that a data packet of logical channel #1 330 may be transmitted through CC1 and CC2, and logical channel #2 340 is mapped to CC3 so that a data packet of logical channel #2 340 may be transmitted through CC3 and the data packet of logical channel #3 may be transmitted through CC2 and CC3. Since a logical channel and a CC are mapped to each other as described above, even if data packets having been copied through packet duplication are subjected to a multiplexing process in the MAC apparatus (entity), it is possible to prevent the data packets from being transmitted through the same CC. In other words, two or more copied data packets are not included in the same MAC PDU, and the original PDCP PDU and the copied PDCP PDU are not transmitted in the same transmission block.

On the other hand, unlike the above-described embodiment, it is also possible to map a logical channel to Numerology or TTI. That is, independently of or in combination with mapping of a logical channel to a CC, it is also possible to map a logical channel to a specific Numerology and/or TTI for data packet transmission. In addition, such a mapping between a logical channel and a CC is not limited to the packet duplication process described above, and may be performed separately from the packet duplication.

Whether or not the bearer allows packet duplication may be determined according to the type of traffic the packet contains. The types of traffic may be classified into voice, video streaming, web surfing data, and the like, and by such a classification, a specific type of traffic may be configured to allow packet duplication. Whether to perform packet duplication may also be configured according to a QoSconfiguration value of data. On the other hand, such QoS configuration value may be represented by an ID indicating QoS such as a QoS flow ID. In this case, it is also possible to allow packet duplication for a specific QoS flow ID. For example, a bearer to which a packet having a QoS flow ID having a value from 0 to 15 is transmitted may perform packet duplication, and a bearer to which a packet having a remaining QoS flow ID is transmitted may not perform packet duplication. Whether the bearer allows packet duplication may be determined by each of the above-mentioned various criteria or a combination of two or more thereof, and other criteria other than the above-mentioned criteria may be applied.

In addition, packet duplication may be applied to both SRBs that transmit a control signal and DRBs that transmit data.

Figure 4:
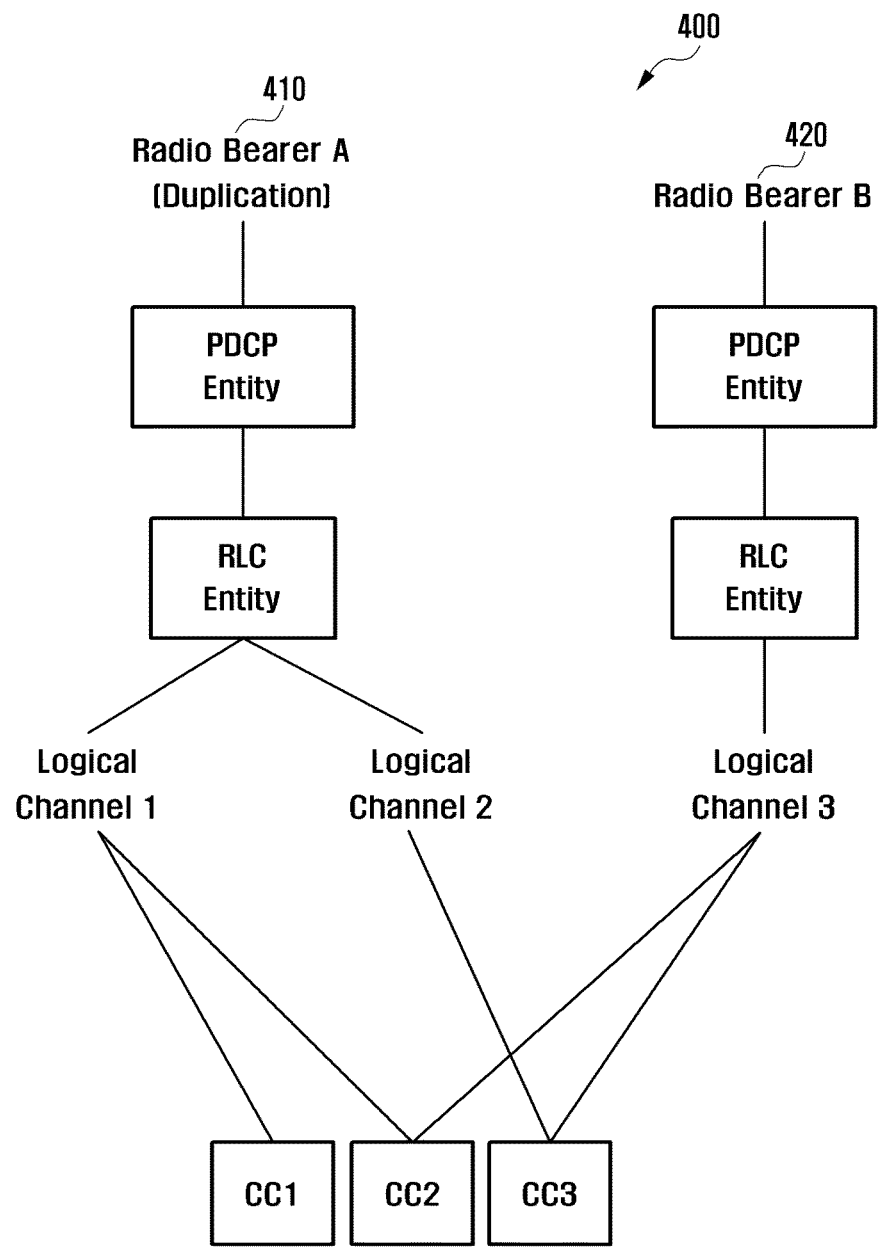
FIG. 4 illustrates a bearer structure for packet duplication according to another embodiment of the disclosure.

FIG. 4 illustrates another embodiment of a bearer structure for packet duplication (as indicated by reference numeral 400). In the embodiment illustrated in FIG. 4, a radio bearer A 410 and a radio bearer B 420 are configured. Generally, one or more signaling radio bearers (SRBs) and data radio bearers may be provided between a base station and a terminal. Radio bearer A 410 is a bearer for which packet duplication is allowed, and radio bearer B 420 is a bearer for which packet duplication is not allowed. In the embodiment illustrated in FIG. 3, a process is shown such that an RLC apparatus (or, entity) of radio bearer A 410 copies an RLC protocol data unit (PDU), and transmits the copied RLC PDUs through different logical channels, respectively. The RLC apparatus of radio bearer A 410 is mapped to logical channels #1 and #2. Since packet duplication in radio bearer B is not allowed, one logical channel is mapped to one logical channel #3.

Here, in order to perform efficient packet transmission, mapping of a logical channel to a component carrier (CC) is required. In other words, by mapping a logical channel to a CC (that is, by establishing/defining a mapping relationship between a logical channel and a CC), it is possible to specify a limit for a CC that can transmit specific logical channel data. In a case of packet duplication, the main purpose thereof is to increase reliability and reduce latency by performing separate data processing of the copied packet and then transmitting the same. In order to effectively achieve this purpose, it is required that the copied data packets are transmitted through different CCs, respectively. In the embodiment illustrated in FIG. 4, logical channel #1 is mapped to CC1 and CC2 so that data packets of logical channel #1 may be transmitted through CC1 and CC2, logical channel #2 is mapped to CC3 so that data packets of logical channel #2 are transmitted through CC3, and the data packet of logical channel #3 may be transmitted through CC2 and CC3. Since a logical channel and a CC are mapped as described above, even if the data packets having been copied through packet duplication are subjected to a multiplexing process in the MAC apparatus (entity), it is possible to prevent the data packets from being transmitted through the same CC. In other words, two or more copied data packets are not included in the same MAC PDU, and the original PDCP PDU and the copied PDCP PDU are not transmitted in the same transmission block.

On the other hand, unlike the above-described embodiment, it is also possible to map a logical channel to Numerology or TTI. That is, independently of or in combination with mapping of a logical channel to a CC, it is also possible to map a logical channel to a specific Numerology and/or TTI for data packet transmission. Also, such a mapping between a logical channel and a CC is not limited to the packet duplication process described above, and may be performed separately from the packet duplication.

In addition, packet duplication may be applied to both SRBs that transmit control signals and DRBs that transmit data.

Figure 5:
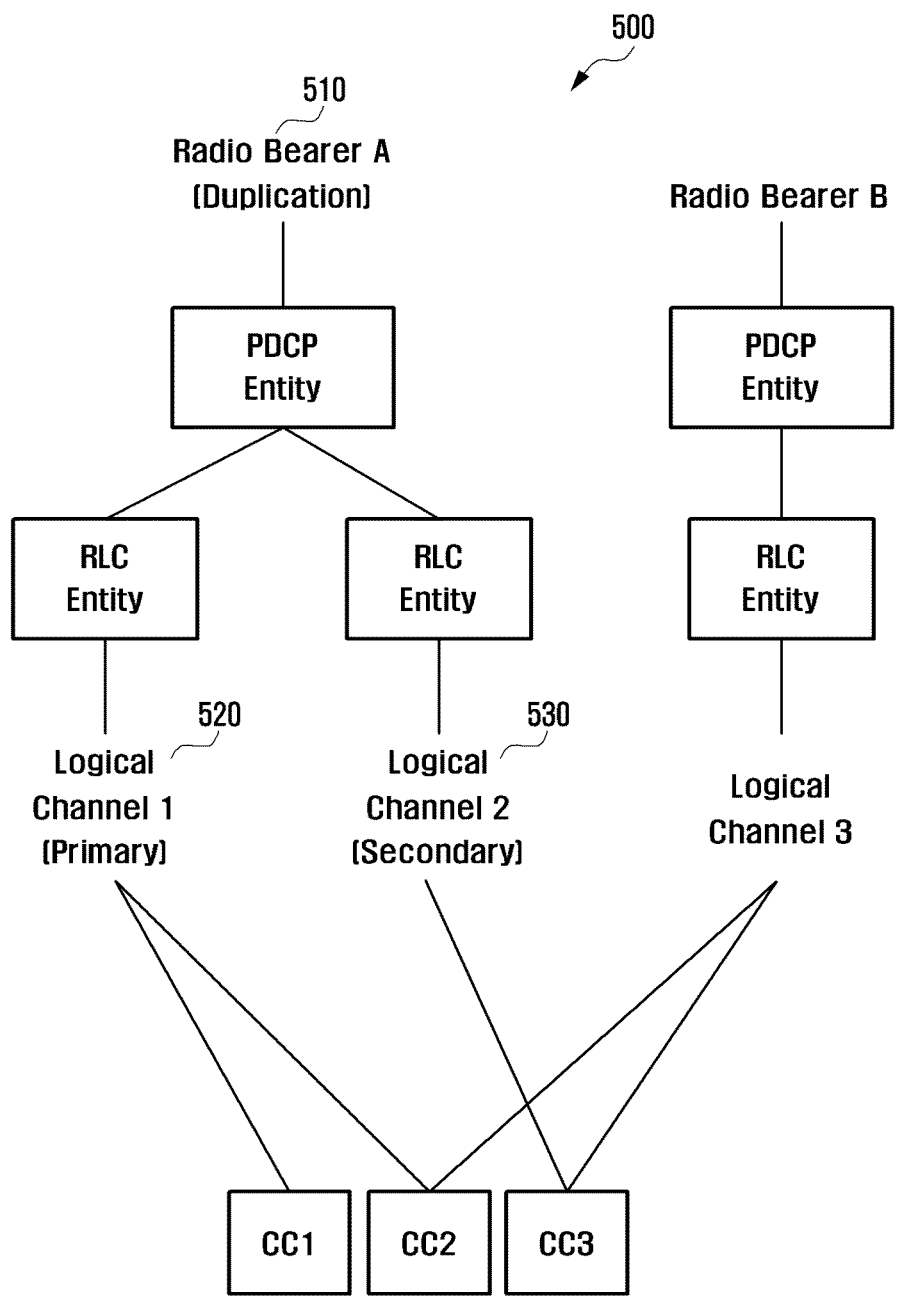
FIG. 5 illustrates a bearer structure for packet duplication according to another embodiment of the disclosure.

FIG. 5 illustrates another embodiment of a bearer structure for packet duplication (as indicated by reference numeral 500). For the efficiency of a communication network, packet duplication may be required to be performed in a predefined specific situation. To this end, logical channels may be classified into and defined as a logical channel (primary logical channel) used both when not performing packet duplication and when performing packet duplication, and a logical channel (secondary logical channel) used in data transmission when performing packet duplication only. In the embodiment illustrated in FIG. 5, with regard to radio bearer A 510 that allows packet duplication, logical channel #1 520 is configured as a primary logical channel, and logical channel #2 530 is configured as a secondary logical channel. The other bearer structure is the same as that defined in FIG. 3. The primary and secondary logical channels may be designated, by abase station, through the RRC configuration, or the like. In addition, the terminal may be notified that data is transmitted on the secondary logical channel, through a packet duplication activation message, or the like. A specific embodiment of such a packet duplication activation message will be described later.

In addition, packet duplication may be applied to both SRBs that transmit control signals and DRBs that transmit data.

Figure 6:
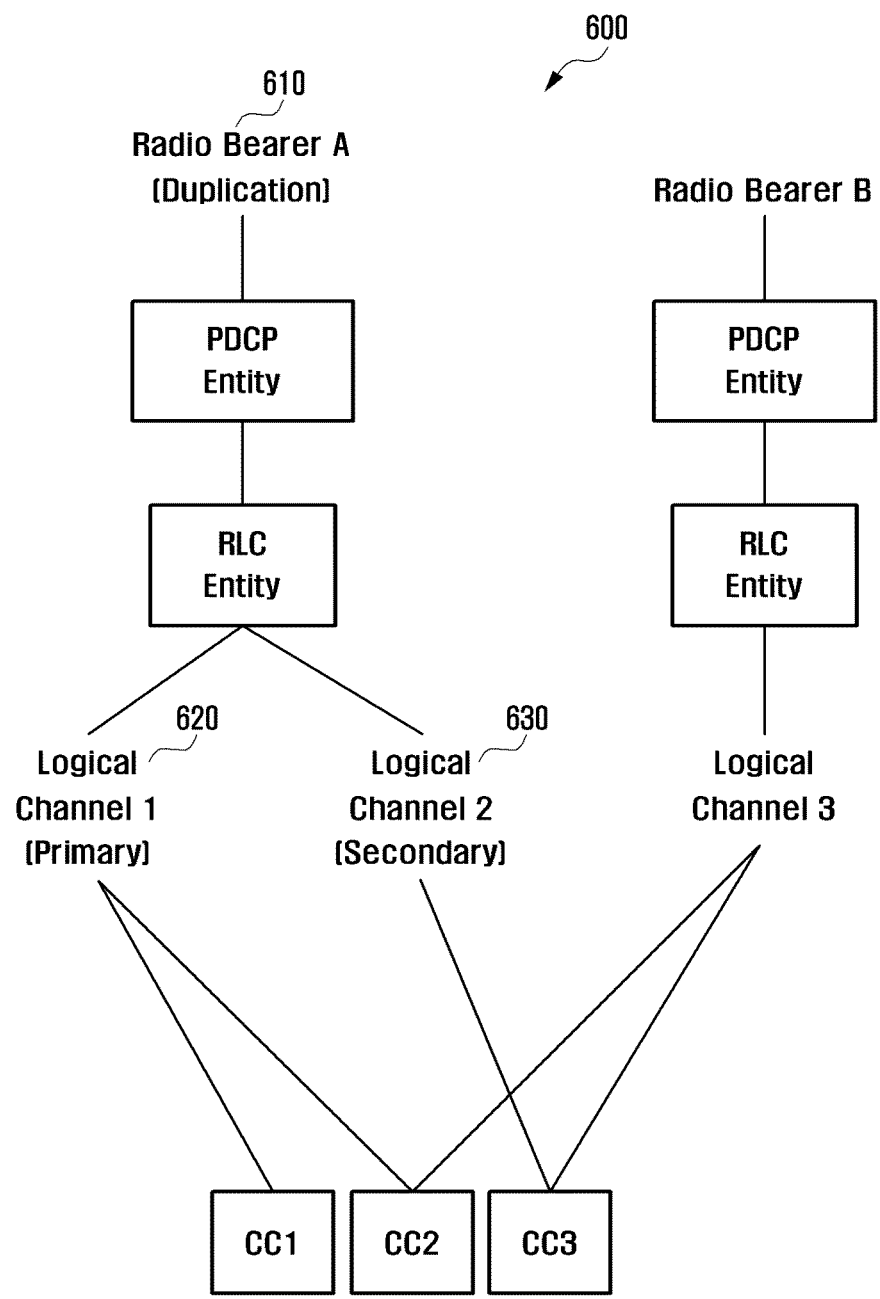
FIG. 6 illustrates a bearer structure for packet duplication according to another embodiment of the disclosure.

FIG. 6 illustrates another embodiment of a bearer structure for packet duplication (as indicated by reference numeral 600). For the efficiency of a communication network, packet duplication may be required to be performed in a predefined specific situation. To this end, logical channels may be classified into and defined as a logical channel (primary logical channel) used both when not performing packet duplication and when performing packet duplication, and a logical channel (secondary logical channel) used in data transmission when performing packet duplication only. In the embodiment illustrated in FIG. 6, with regard to radio bearer A 610 that allows packet duplication, logical channel #1 620 is configured as a primary logical channel, and logical channel #2 630 is configured as a secondary logical channel. The other bearer structure is the same as that defined in FIG. 4. The primary and secondary logical channels may be designated by abase station, through the RRC configuration, or the like. In addition, the terminal may be notified that data is transmitted through the secondary logical channel, through a packet duplication activation message, or the like. A specific embodiment of such a packet duplication activation message will be described later.

In addition, packet duplication may be applied to both SRBs that transmit control signals and DRBs that transmit data.

Figure 7:
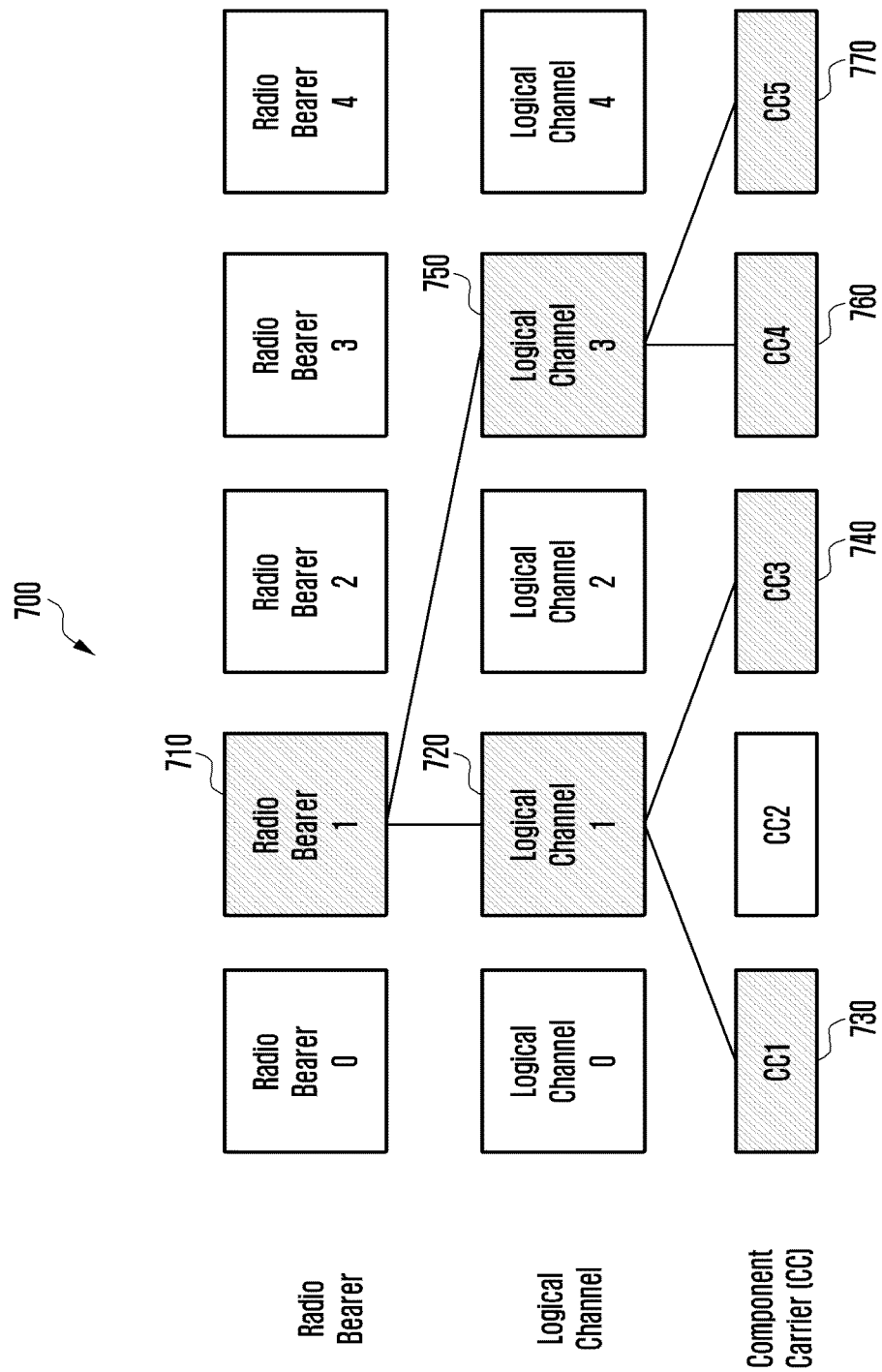
FIG. 7 illustrates a bearer structure for packet duplication according to another embodiment of the disclosure.

FIG. 7 illustrates still another embodiment of a bearer structure for packet duplication (as indicated by reference numeral 700). FIG. 7 shows a simplified structure in which a single radio bearer shown in the embodiments of FIGS. 3 to 6 is mapped to multiple logical channels and CCs, and a PDCP apparatus and an RLC apparatus are omitted therein. The PDCP apparatus and RLC apparatus may be implemented using one of mapping methods of the embodiment illustrated in FIGS. 3 to 6. In the embodiment illustrated in FIG. 7, radio bearer #1 710 for which packet duplication has been performed is transmitted through logical channels #1 and #3 720 and 750, in which logical channel #1 720 is mapped to CC1 730 and CC3 740 and then transmitted therethrough, and logical channel #3 750 is mapped to CC4 760 and CC5 770 and then transmitted therethrough.

In addition, packet duplication may be applied to both SRBs that transmit control signals and DRBs that transmit data.

Figure 8:
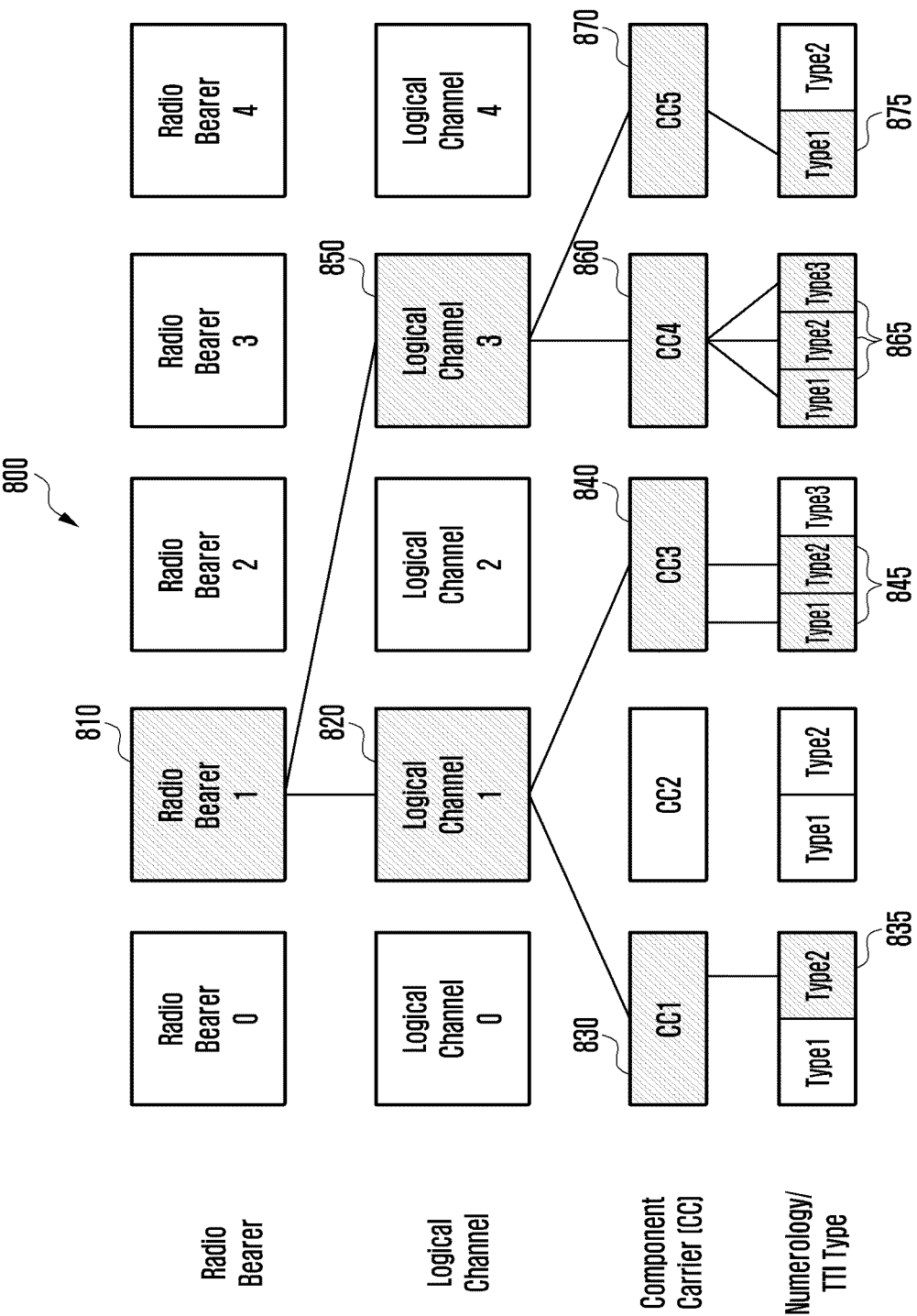
FIG. 8 illustrates a bearer structure for packet duplication according to another embodiment of the disclosure.

FIG. 8 illustrates another embodiment of a bearer structure for packet duplication (as indicated by reference numeral 800). FIG. 8 shows a simplified structure in which a single radio bearer shown in the embodiments of FIGS. 3 to 6 is mapped to multiple logical channels and CCs, and a PDCP apparatus and an RLC apparatus are omitted therein. The PDCP apparatus and RLC apparatus may be implemented using one of mapping methods of the embodiment illustrated in FIGS. 3 to 6. In the embodiment illustrated in FIG. 8, a radio bearer #1 810 for which packet duplication is performed is transmitted through logical channels #1 and #3 820 and 850, in which logical channel #1 820 is mapped to CC1 830 and CC3 840 and then transmitted therethrough, and logical channel #3 850 is mapped to CC4 860 and CC5 870 and then transmitted therethrough. In the embodiment illustrated in FIG. 8, it is additionally shown that each CC supports multiple Numerologies or TTI types. For example, type 1 of CC1 830 may have a subcarrier spacing of 15 KHz and 1 ms TTI, and type 2 835 may have a subcarrier spacing of 30 KHz and a 0.25 ms TTI. In the embodiment illustrated in FIG. 8, radio bearer #1 810 for which packet duplication is performed may be transmitted through type 2 (835) of CC1 830, types 1 and 2 (845) of CC3 840, types 1, 2, and 3 (865) of CC4 (860), and type 1 (875) of CC5 (870). The above description may be understood such that a specific Numerology and/or TTI type has been previously mapped to a logical channel and/or a CC through which copied data packets obtained by performing packet duplication are transmitted. On the other hand, the mapping described above is an embodiment and may be differently designated according to the configuration of a base station or a terminal, the type of traffic, QoS flow ID, and the like.

In addition, packet duplication may be applied to both SRBs that transmit control signals and DRBs that transmit data.

Figure 9:
FIG. 9 illustrates a radio bearer configuration message for packet duplication according to an embodiment of the disclosure.

FIG. 9 illustrates an embodiment of a radio bearer configuration message for packet duplication described in FIG. 3 to FIG. 8 (as indicated by reference numeral 900). A DRB ID configured in FIG. 9 is 6 and a DuplicationMode field is configured as true, so that it may be indicated that packet duplication is allowed. FIG. 9 shows that a logical channel ID (indicated as a LogicalChannelIdentity field) that performs packet duplication is 4 and 5, and a packet transmitted through logical channel #4 may be transmitted only in 15 KHz and 30 KHz Numerologies (as indicated by a Correspondingnumerology field) of CCs 1, 2, and 3, and a packet transmitted through logical channel #5 may use all the CCs and be transmitted only in a 15 kHz Numerology thereamong. The Numerology may be displayed in frequency intervals as shown in FIG. 9, but may also be designated as a previously configured Numerology or TTI type. Logical channel #4 thereamong is a primary logical channel and logical channel #5 is a secondary logical channel (as indicated by a DuplicationType field). In addition, each logical channel may independently perform duplicate transmission of the same packet, and independently perform duplicate packet transmission as many times as the value configured in the NumberOfDuplication field. Independent duplicate packet transmission means that a transmitter determines to perform the transmission once more without receiving NACK of an ARQ.

Figure 10:
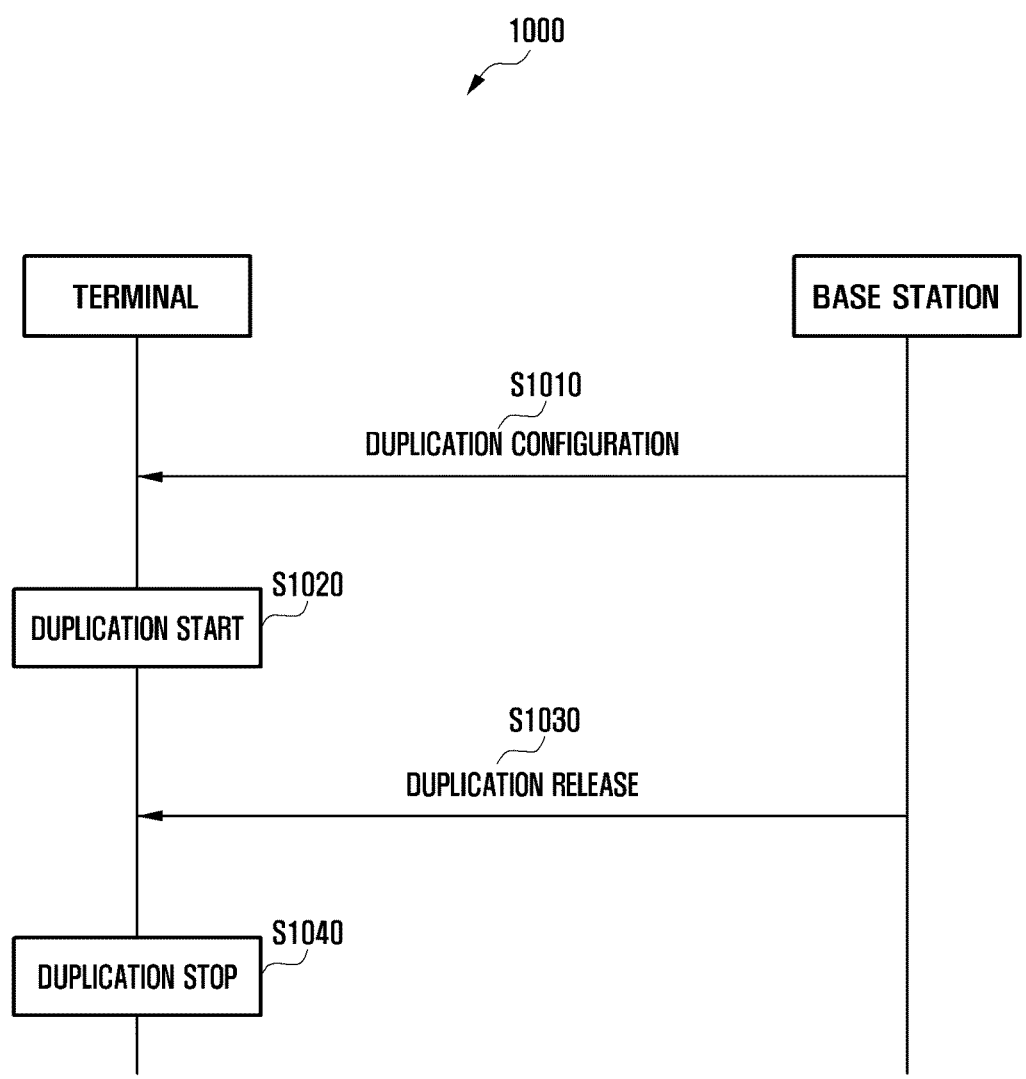
FIG. 10 illustrates configuration and release of packet duplication according to an embodiment of the disclosure.

FIG. 10 illustrates an embodiment for performing configuration and release of packet duplication (as indicated by reference numeral 1000). A base station may configure packet duplication of a radio bearer by transmitting a duplication configuration message to a terminal (S1010). The message may include some of the configuration messages of FIG. 9. In the embodiment illustrated in FIG. 10, when the duplication configuration message is received, a terminal configures a bearer for packet duplication and performs packet duplication (S1020). After that, when the terminal receives a duplication release message from a base station (S1030), the terminal may release the bearer for packet duplication, release the secondary logical channel for packet duplication, or perform a process of not performing packet duplication (S1040).

Figure 11:
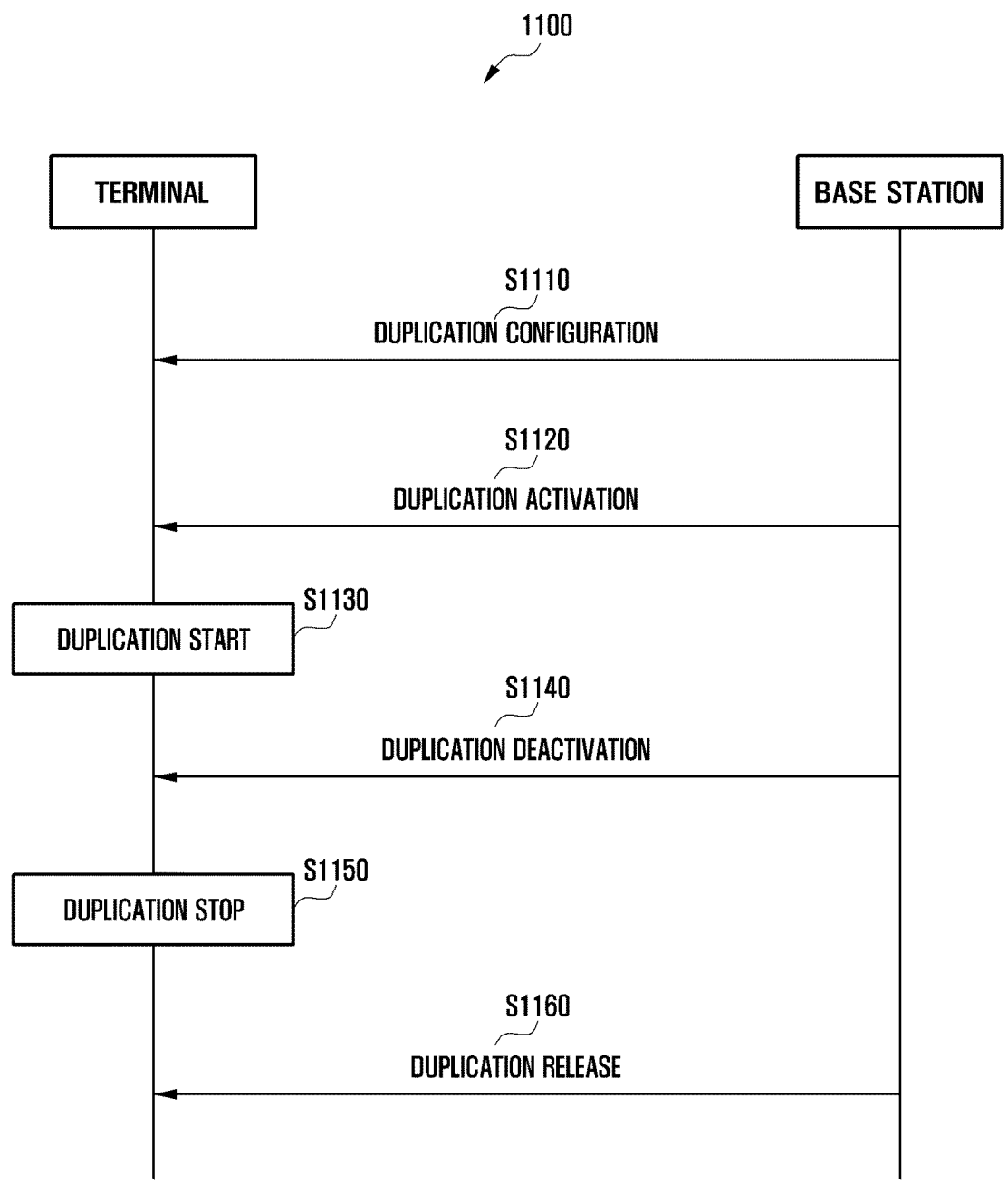
FIG. 11 illustrates configuration and release of packet duplication according to another embodiment of the disclosure.

FIG. 11 illustrates another embodiment for performing configuration and release of packet duplication (as indicated by reference numeral 1100). A base station may configure packet duplication of a radio bearer by transmitting a duplication configuration message to a terminal (S1110). The message may include some of the configuration messages of FIG. 9. In the embodiment illustrated in FIG. 11, when the duplication configuration message is received, a terminal configures a bearer for packet duplication. After that, when receiving a duplication activation message (S1120), the terminal performs actual packet duplication (S1130). Before a duplication activation message is received, a logical channel for packet duplication is generated but no actual data is transmitted through a logical channel. At this time, data transmission through a primary logical channel only may be performed. After that, when receiving the duplication deactivation message from a base station (S1140), the terminal stops actual packet duplication (S1150). However, at this time, a bearer structure, such as a logical channel for packet duplication, is not changed. If there is a secondary logical channel, data transmission through the secondary logical channel may be stopped. After that, when a base station receives a duplication release message from a base station (S1160), the terminal may release a bearer for packet duplication or release a secondary logical channel for packet duplication, or perform a procedure of not performing packet duplication.

Figure 12:
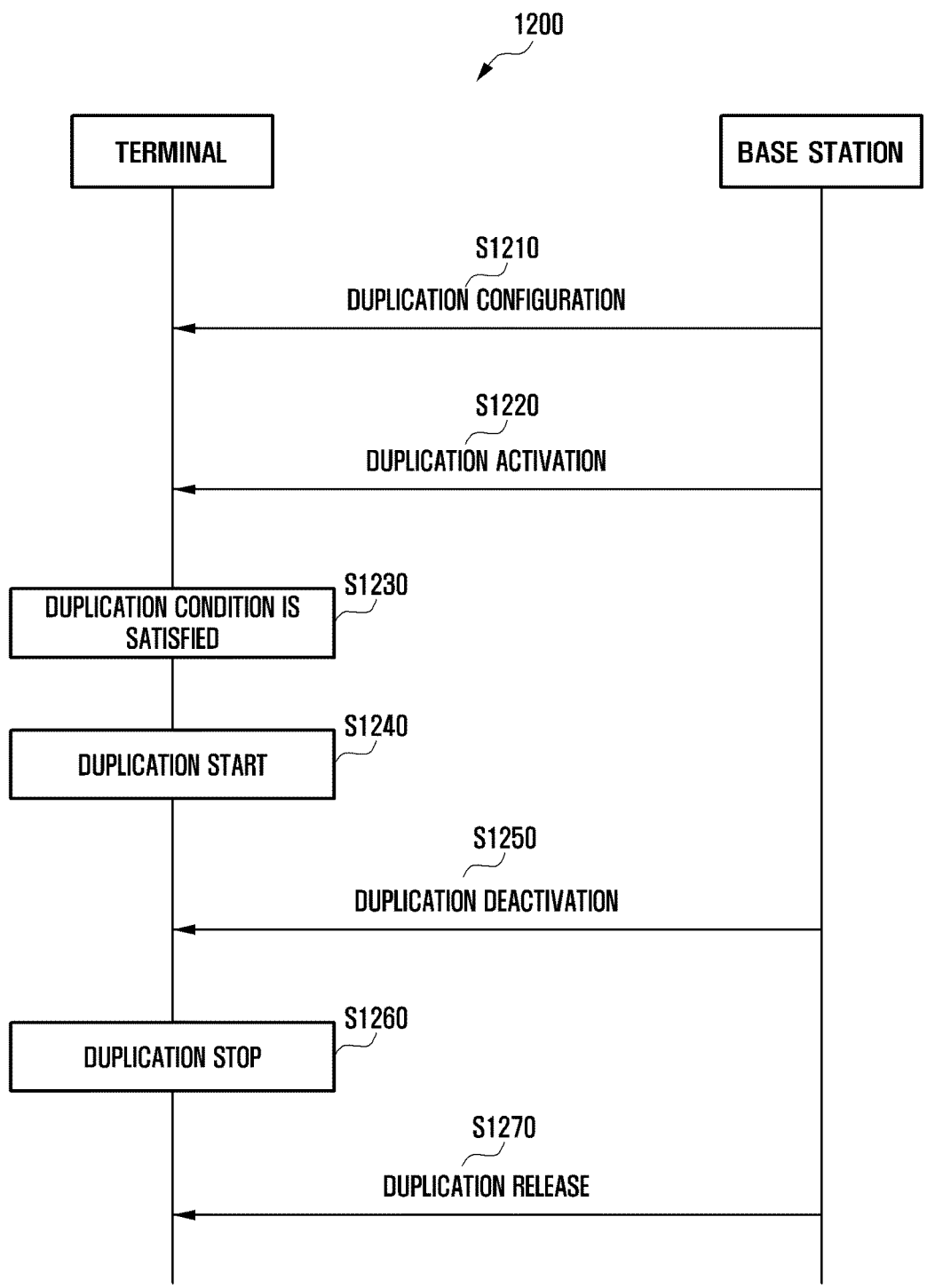
FIG. 12 illustrates configuration and release of packet duplication according to another embodiment of the disclosure.

FIG. 12 illustrates another embodiment for performing configuration and release of packet duplication (as indicated by reference numeral 1200). A base station may configure packet duplication of a radio bearer by transmitting a duplication configuration message to a terminal (S1210). The message may include some of the configuration messages of FIG. 9. In the embodiment illustrated in FIG. 12, when the duplication configuration message is received, the terminal configures a bearer for packet duplication. After that, when a terminal receives a duplication activation message (S1220) and a previously configured condition for packet duplication (duplication condition) is satisfied (S1230), the terminal performs actual packet duplication (S1240). The condition for packet duplication may be such that the radio link quality of a terminal and a base station is equal to or lower than a certain level. Before a duplication activation message is received, a logical channel for packet duplication is generated but no actual data is transmitted through the logical channel. At this time, data transmission through the primary logical channel only may be performed. If a previously configured condition for packet duplication is no longer satisfied or a condition for cancellation of packet duplicate transmission is satisfied, packet duplication may not be performed even after reception of the duplication activation message. Further, when receiving a duplication deactivation message from the base station (S1250), the terminal stops actual packet duplication (S1260). However, at this time, a bearer structure such as a logical channel for packet duplication is not changed. If there is a secondary logical channel, data transmission through the secondary logical channel may be stopped. After that, when the terminal receives a duplication release message from the base station (S1270), the terminal may release a bearer for packet duplication, release a secondary logical channel for packet duplication, or perform a procedure of not performing packet duplication.

Figure 13:
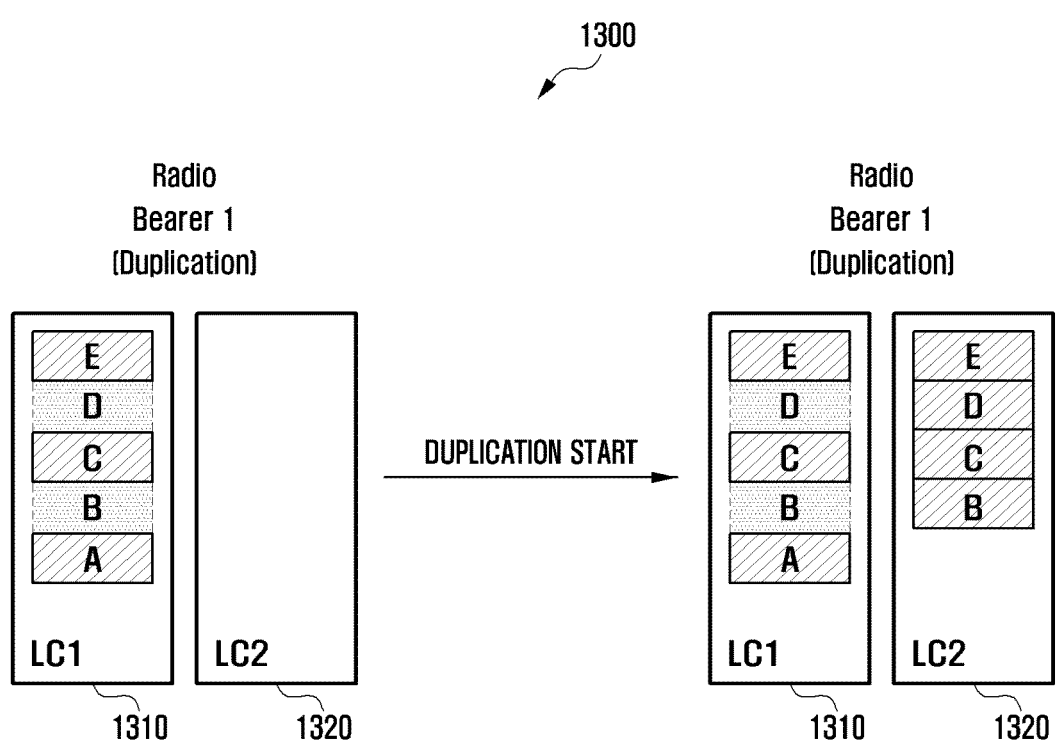
FIG. 13 illustrates a scheme of starting packet transmission through a logical channel for packet duplication when packet duplication is started according to an embodiment of the disclosure.

FIG. 13 illustrates an embodiment of a scheme of starting packet transmission through a logical channel for packet duplication when packet duplication is started (as indicated by reference numeral 1300). In the embodiment illustrated in FIG. 13, it is assumed that transmission through logical channel #1 (LC1, 1310) only is performed before duplicate transmission, and when packet duplication is started, transmission is also performed through logical channel #2 (LC2, 1320). Packet duplication may be performed on the basis of a time point at which actual packet duplication begins according to various embodiments illustrated and described in FIG. 10 to FIG. 12. In the embodiment illustrated in FIG. 13, when packet duplication has been started, packets, which have been transmitted from existing logical channel #1 1310 but no ACK for the packest has been received yet, may be transferred (that is, copied) from the buffer through logical channel #2 1320 in the sequence from a packet having the earliest sequence number (SN). In the embodiment illustrated in FIG. 13, even when packets A to E have been transmitted, since only packets A, C, and E are in the reception state at the packet duplication start time, all packets (that is, B to E) starting from packet B, which has the earliest sequence number among packets B and D which have not received ACK, are transferred (that is, copied) through logical channel #2 1320 so as to perform packet transmission.

In this case, the RLC sequence number (SN) of logical channel #2 1320 may be started from the beginning, otherwise the sequence number of the RLC apparatus of logical channel #1 1320 may be used as it is. If the same sequence numbers are used for logical channel #1 1310 and logical channel #2 1320, a part of the RLC state information of logical channel #1 1310 may be transmitted to an RLC apparatus corresponding to logical channel #2 1320 of a receiver. Here, the corresponding information may include the start of the RLC SN where transmission begins (RLC SN of packet B), all RLC variables, or the like. In addition, the corresponding information may be PDCP SN or PDCP COUNT corresponding to each RLC packet according to the embodiment.

Figure 14:
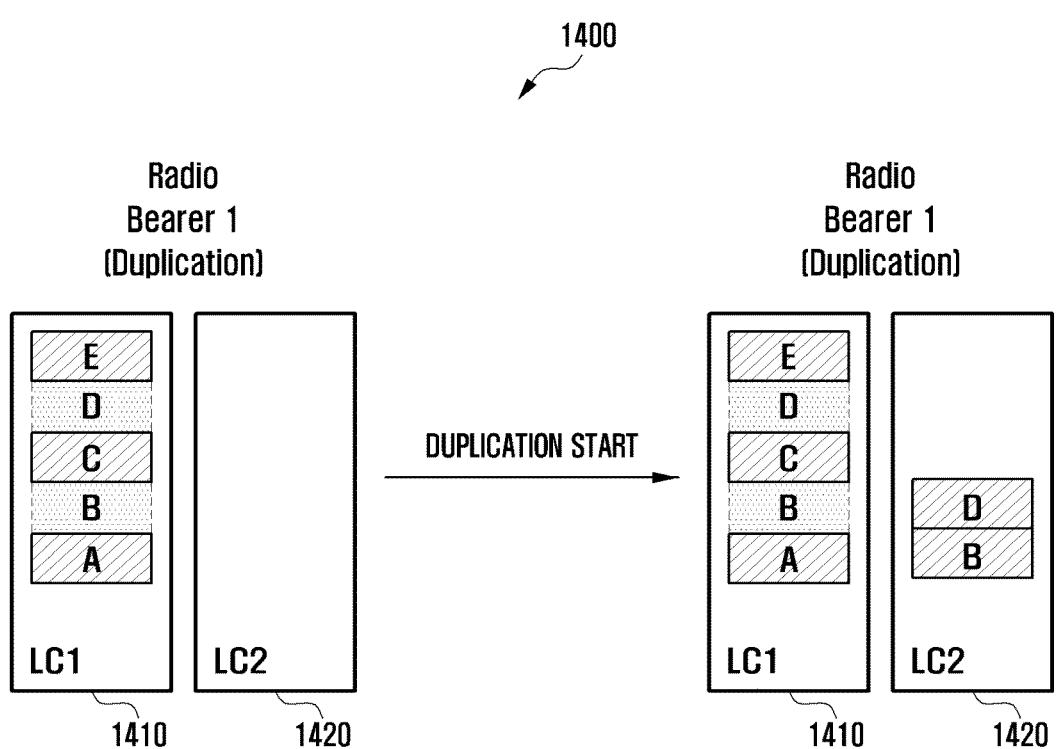
FIG. 14 illustrates a scheme of starting packet transmission through a logical channel for packet duplication when packet duplication is started according to another embodiment of the disclosure.

FIG. 14 illustrates another embodiment of a scheme of starting packet transmission through a logical channel for packet duplication when packet duplication is started (as indicated by reference numeral 1400). In the embodiment illustrated in FIG. 14, it is assumed that transmission through logical channel #1 (LC1, 1410) only is performed before duplicate transmission, and when packet duplication is started, transmission is also performed through logical channel #2 (LC2, 1420). Packet duplication may be performed on the basis of a time point at which actual packet duplication begins according to various embodiments illustrated and described in FIG. 10 to FIG. 12. In the embodiment illustrated in FIG. 14, when packet duplication is started, packets having been transmitted through existing logical channel #1 1410 but not having received ACK, and packets that have not been transmitted and remain in the buffer may be transferred (that is, copied) through logical channel #2 1420 in the sequence starting from the packet having the earliest sequence number (SN). In the embodiment illustrated in FIG. 14, even if packets A to E have been transmitted, since only packets A, C, and E are in the reception state at the packet duplication start time, packets B and D which have not received ACK may be transferred (that is, copied) through logical channel #2 1420, so as to perform packet transmission thereof. If all packets have received ACK, the remaining packets in the buffer may be copied and transmitted through logical channel #2 1420.

In this case, the RLC sequence number (SN) of logical channel #2 1420 may start from the beginning, or may use the sequence number of the RLC apparatus of logical channel #1 1410 as it is. If the same sequence numbers are used for logical channel #1 1410 and logical channel #2 1420, a part of the RLC state information of logical channel #1 1410 may be transmitted to the RLC apparatus corresponding to logical channel #2 1420 of a receiver. Here, the corresponding information may include the start of the RLC SN where transmission begins (RLC SN of packet B) or all RLC variables, and the like. In addition, the corresponding information may be PDCP SN or PDCP COUNT corresponding to each RLC packet according to the embodiment.

Figure 15:
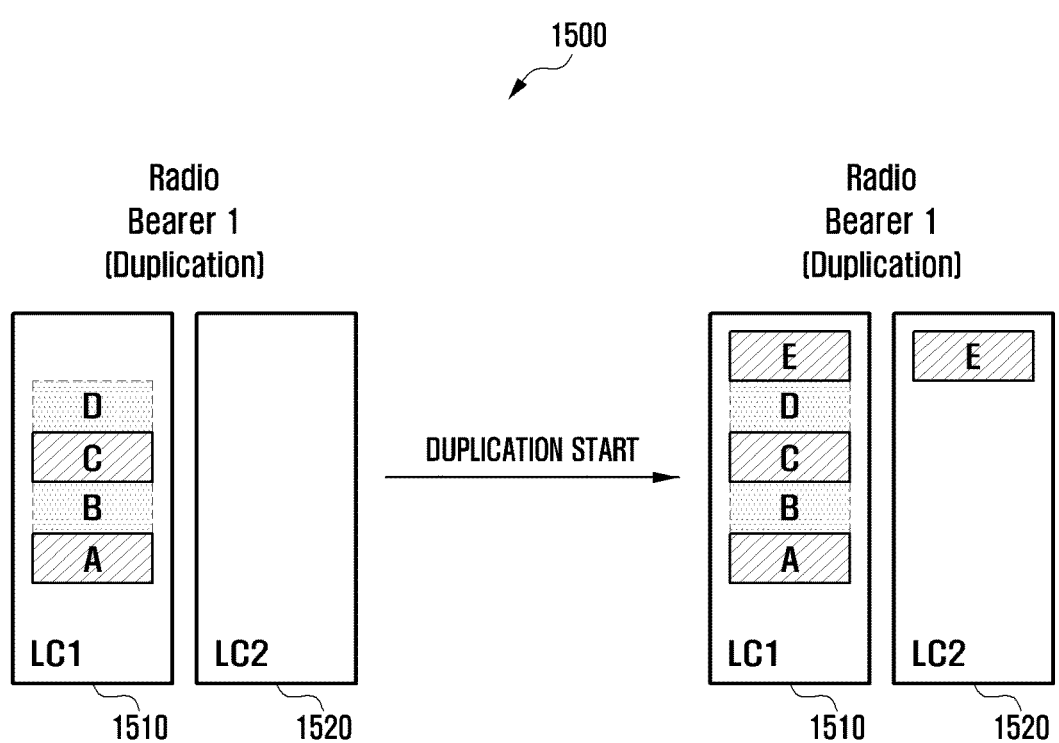
FIG. 15 illustrates a scheme of starting packet transmission through a logical channel for packet duplication when packet duplication is started according to another embodiment of the disclosure.

FIG. 15 illustrates another embodiment of a scheme of starting packet transmission through a logical channel for packet duplication when packet duplication is started (as indicated by reference numeral 1500). In the embodiment illustrated in FIG. 15, it is assumed that transmission through logical channel #1 (LC1, 1510) only is performed before duplicate transmission and, when packet duplication is started, transmission is also performed through logical channel #2 (LC2, 1520). Packet duplication may be performed on the basis of a time point at which actual packet duplication begins according to various embodiments illustrated and described in FIG. 10 to FIG. 12. In the embodiment illustrated in FIG. 15, when packet duplication is started, a packet having the earliest sequence number (SN), among packets that have not been transmitted from the existing logical channel #1 1510, may be transferred (that is, copied) through logical channel #2 1520. In the embodiment illustrated in FIG. 15, even if packets A to D have been transmitted, since only packets A and C are in the reception state at the packet duplication start time, packet duplication is performed such that packet duplication is configured for a packet E, which has not been transmitted, and then transferred (that is, copied) through logical channel #1 1510 and logical channel #2 1520. In other words, a data packet which logical channel #1 1510 has not transmitted may be copied and transmitted through logical channel #2 1520.

In this case, the RLC sequence number (SN) of logical channel #2 1520 may start from the beginning, or otherwise may use the sequence number of the RLC apparatus of logical channel #1 1510 as it is. If the same sequence numbers are used for logical channel #1 1510 and logical channel #2 1520, a part of the RLC state information of logical channel #1 1510 may be transmitted to the RLC apparatus corresponding to logical channel #2 1520 of a receiver. Here, the corresponding information may include the start of the RLC SN (RLC SN of packet B) at which transmission begins or all RLC variables, and the like. In addition, the corresponding information may be PDCP SN or PDCP COUNT corresponding to each RLC packet according to the embodiment.

Figure 16:
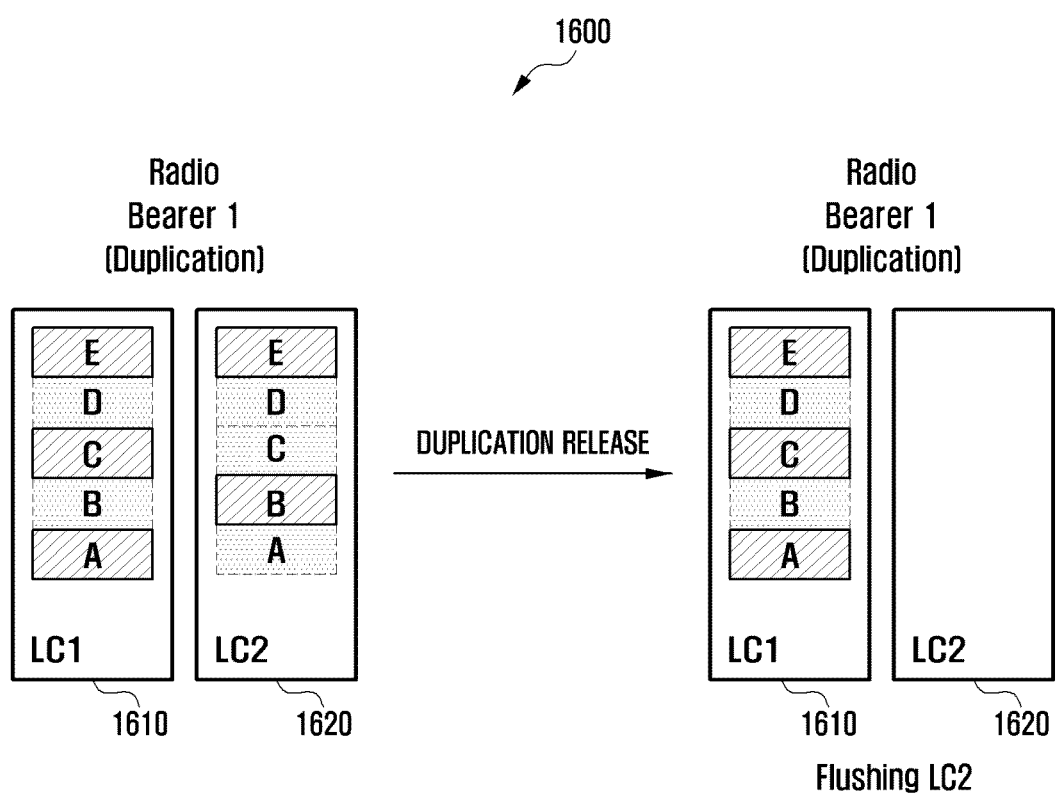
FIG. 16 illustrates a procedure performed when packet duplication is released according to an embodiment of the disclosure.

FIG. 16 illustrates an embodiment of a procedure performed when packet duplication is released while performing data transmission in a state where packet duplication is performed (as indicated by reference numeral 1600). In the embodiment illustrated in FIG. 16, an operation performed at a time of releasing actual packet duplication according to various embodiments described in FIG. 10 to FIG. 12 while performing packet transmission through packet duplication through logical channels #1 and #2 1610 and 1620 is described. In the embodiment illustrated in FIG. 16, at the moment when packet duplication is released, in logical channel #1 1610, ACK for packets A, C, and E has been received and transmission of packets B and D has been performed, but ACK for the packets B and D has not been received yet, and in logical channel #2 1620, ACK for packets B and E has been received and transmission of packes A, C, and D has been performed, but ACK for the packets A, C, and D has not been received yet. Here, in order not to perform packet duplication, data is to emptied out of one logical channel among logical channels. In FIG. 16, it is assumed that data is arbitrarily emptied out of logical channel #2 (1620), but a logical channel may be selected according to a specific condition. Here, the specific condition may be a scheme of continuously performing transmission through a primary logical channel, and emptying data out of a secondary logical channel and not performing transmission thereof.

Figure 17:
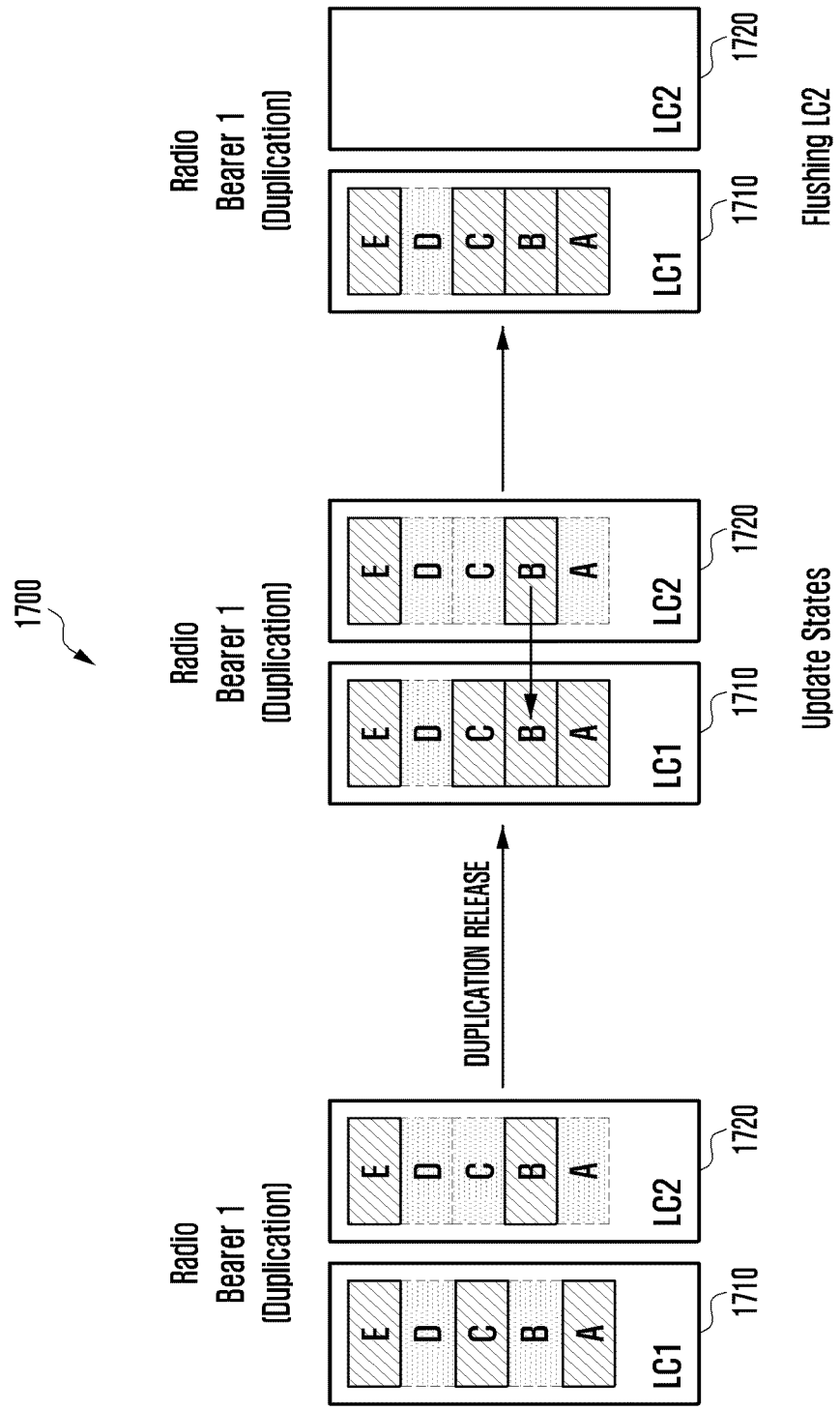
FIG. 17 illustrates a procedure performed when packet duplication is released according to another embodiment of the disclosure.

FIG. 17 illustrates another embodiment of a procedure performed when packet duplication is released while performing data transmission in a state where packet duplication has been performed (as indicated by reference numeral 1700). FIG. 17 illustrates an operation performed at the time of releasing actual packet duplication according to various embodiments described in the description of FIG. 10 to FIG. 12 while performing packet transmission through packet duplication through logical channels #1 and #2 (1710 and 1720). In the embodiment illustrated in FIG. 17, at the moment when packet duplication is released, in logical channel #1 1710, ACK for packets A, C and E has been received and transmission of packets B and D has been performed, but ACK for the packets B and D has not been received yet, and in logical channel #2 1720, ACK for packets B and E has been received and transmission of packets A, C, and D has been performed, but ACK for the packets A, C, and D has not been received yet. Here, in order not to perform packet duplication, data is to be emptied out of one logical channel among logical channels. In FIG. 17, it is assumed that data is arbitrarily emptied out of logical channel #2 1720, but a logical channel may be selected according to a specific condition. Here, the specific condition may be a scheme of continuously performing transmission through a primary logical channel, and emptying data out of a secondary logical channel and not performing transmission thereof.

However, in case of packet B, since transmission already has been successful, information indicating the transmission success may be transmitted through logical channel #1 1710 before emptying logical channel #2 1720, so that unnecessary retransmission can be prevented. In the embodiment illustrated in FIG. 17, the RLC apparatus (or entity) of logical channel #2 1720 informs the RLC apparatus of logical channel #1 1710 that packets that have successfully received ACK are packets B and E, and the RLC apparatus of logical channel #1 1710 may update a state of packet B, which has not received ACK, to a successful reception state and assume that the packet her B has successfully received ACK. The transmission of information described above may be performed in a way of directly informing the RLC sequence number (SN) of a packet transmitted from the RLC apparatus of logical channel #2 1720 to the RLC apparatus of logical channel #1 1710, or may be performed such that the RLC apparatus of logical channel #2 1720 informs the PDCP apparatus in a radio bearer of the PDCP sequence number (or RLC SN) of the corresponding packet so that the PDCP apparatus informs the RLC apparatus in logical channel #1 1710 of the sequence number (RLC or PDCP SN) of the corresponding packet. If the RLC sequence numbers of logical channel #1 1710 and logical channel #2 1720 are different for each packet, a process of converting such a value may be performed. Here, the PDCP sequence number, the PDCP COUNT value, and the like may be used in the conversion process. In addition, according to the embodiment, the RLC apparatus of one logical channel may directly inform the RLC apparatus in another logical channel of the PDCP SN or the PDCP COUNT information of the packet that has received ACK or NACK of the corresponding packet.

In the embodiment illustrated in FIG. 17, when the packet duplicate transmission is released, the transmission status of each logical channel described above, that is, the RLC state information or the ACK reception status is transmitted and reflected to another logical channel. However, such an operation is not limited to the time point when the packet duplicate transmission is released, and it is possible to perform a procedure of notifying of the transmission status between logical channels and reflecting the same therein even in a situation where normal packet duplication is performed and transmitted. The transmission of such information may be performed in a way of directly informing the RLC sequence number (SN) of the packet transmitted from the RLC apparatus of logical channel #2 1720 to the RLC apparatus of logical channel #1 1710, or may be performed such that the RLC apparatus of logical channel #2 1720 informs the PDCP apparatus in a radio bearer of a PDCP sequence number of the corresponding packet so that the PDCP apparatus informs the RLC apparatus in logical channel #1 1710 of the sequence number of the corresponding packet. If the RLC sequence numbers of logical channel #1 1710 and logical channel #2 1720 are different for each packet, a process of converting such a value may be performed. Here, the PDCP sequence number, the PDCP COUNT value, and the like may be used in the conversion process. According to the embodiment, a transmission interval may be configured as a preconfigured value so that the information transmission process does not occur too frequently. For example, the transmission interval may be configured such that the transmission status of a logical channel is transmitted from one logical channel to another logical channel every 10 ms. Further, such an operation may also be applied to a case where packet duplication is applied to different HARQ apparatuses in a HARQ situation rather than an ARQ situation.

Meanwhile, as described in the embodiments of FIG. 16 and FIG. 17, when the packet duplication is released, with regard to packets that exist in the PDCP buffer and have not been transferred to a lower layer, such as the RLC, etc. packet transmission may be continuously performed without packet duplication.

Figure 18:
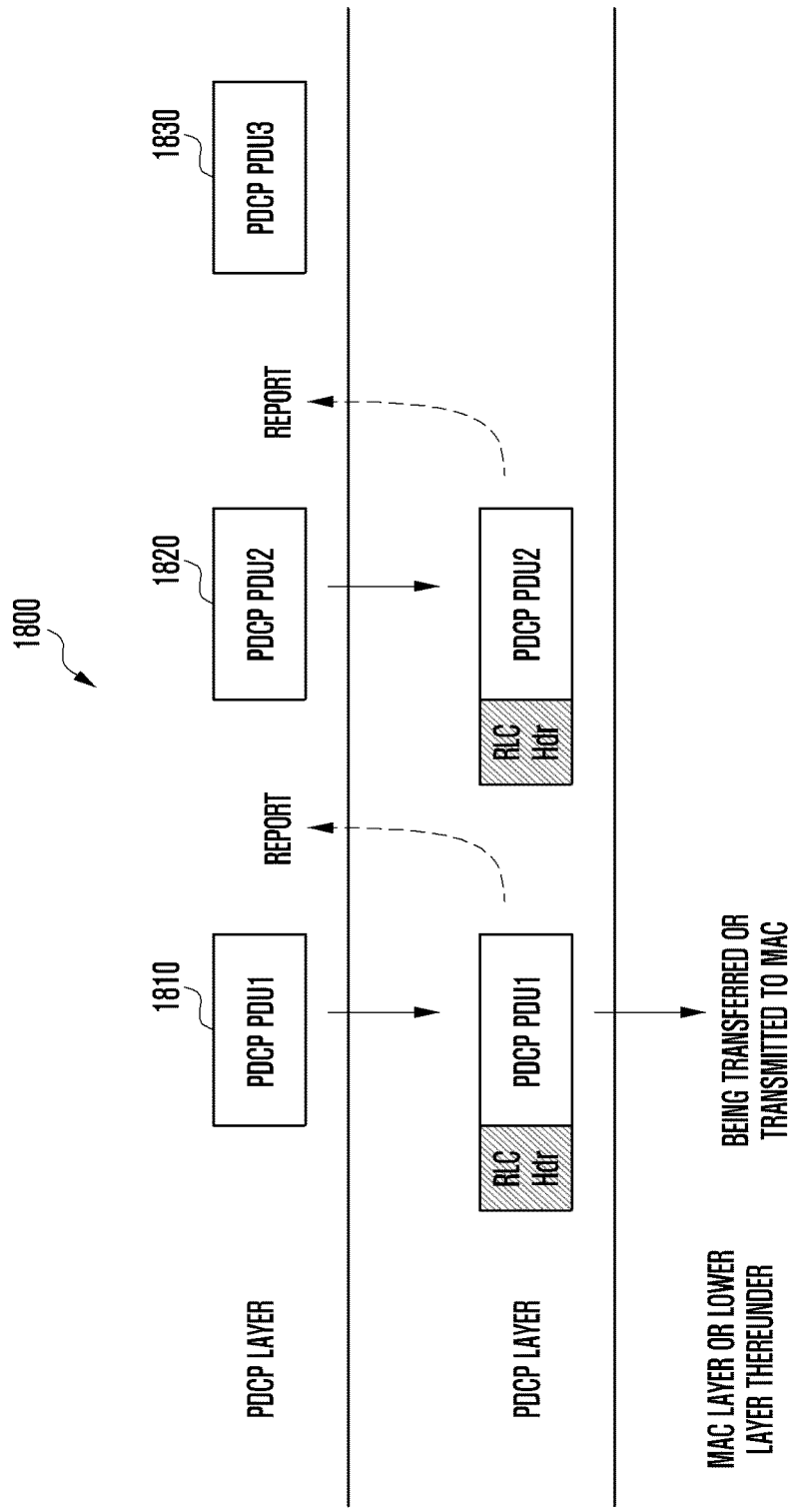
FIG. 18 illustrates an example of a detailed operation when packet duplication is performed.

FIG. 18 illustrates a specific operation example when packet duplication is performed (as indicated by reference numeral 1800). In FIG. 18, the status of PDCP PDU #1 1810, PDCP PDU #2 1820, and PDCP PDU #3 1830 at an arbitrary time point is illustrated as an example. In the case of PDCP PDU #1 1810, a packet having arrived at a PDCP layer of a transmitter is transferred to an RLC layer to allow an RLC header to be added thereto, and then, the same is transmitted to a receiver or transferred to a MAC layer or a lower layer thereunder. In the case of PDCP PDU #2 1820, a packet having arrived at a PDCP layer of a transmitter is transferred to an RLC layer to allow an RLC header to be added thereto, but the same is not yet transferred to a MAC layer or a lower layer thereunder. PDCP PDU #2 1820 may be generated when a packet is previously generated (pre-processed) before a radio resource of an UL grant is allocated. PDCP PDU #3 1830 may be interpreted as a state in which a packet having arrived at the PDCP layer of the transmitter does not request processing thereof to a lower layer.

According to an embodiment, when packet duplication is performed, duplicate transmission of packets, which have not been transferred to the RLC layer among packets having arrived at the PDCP layer of the transmitter, may be started. In the embodiment illustrated in FIG. 18, PDCP PDU #3 1830 corresponds to a packet for duplicate transmission. Duplicated transmission of packets, such as PDCP PDU #1 1810 and PDCP PDU #2 1820, which have already been transferred to the RLC layer may not be started.

According to another embodiment, when packet duplication is performed, duplicate transmission may be started for: a packet (for example, PDCP PDU #1 1810 of FIG. 18) which has been transferred to the RLC layer to allow the RLC header to be added thereto, and then is transferred to a MAC layer or a lower layer thereunder or transmitted thereafter, among packets having arrived at the PDCP layer of the transmitter; a packet (for example, PDCP PDU #2 18120 of FIG. 18) having arrived at the PDCP layer of the transmitter and transferred to the RLC layer to allow the RLC header to be added thereto, but has not been transferred to a MAC layer or a lower layer thereunder; and a packet (for example, PDCP PDU #3 18930 of FIG. 18) having arrived at the PDCP layer of the transmitter and not transferred to the RLC layer. To this end, when duplicate transmission is started, the transmitter may transmit (or report), to the PDCP layer, information on a packet, which is in a state of not yet having successfully received acknowledgement, among packets having been transferred to the RLC layer. Here, the packet information transmitted to the PDCP layer may include PDCP SN and the like. Based on the information, the transmitter may select packets corresponding to the received packet information, and may start packet duplicate transmission. In order to transmit the packet information, the RLC or PDCP layer may manage the RLC sequence number (SN) of the packets and the value of the PDCP SN. Based on the management of the RLC or PDCP SN, the PDCP sequence number value of packets which have not been successfully transmitted and exist in the RLC buffer may be known.

FIG. 19 illustrates an embodiment in which a terminal transmits an uplink buffer status report to a base station when packet duplication is performed (as indicated by reference numeral 1900). In the embodiment illustrated in FIG. 19, radio bearers 1 and 2 do not perform packet duplication and are mapped to logical channels #1 and #2, respectively. However, it is assumed that packet duplication is configured for a radio bearer #3 and the radio bearer #3 is mapped to logical channel #3 1910 and logical channel #4 1920. A buffer status report is performed on the basis of the buffer status of each logical channel. Therefore, a logical channel for which packet duplication is performed at the time point of transmitting the buffer status report is required to determine what buffer status to report.

In the embodiment illustrated in FIG. 19, for logical channels #1 and #2, packet duplication is not performed and the corresponding buffer status is used as it is. However, with regard to logical channels #3 and #4 1910 and 1920, a buffer status of logical channel #3 1910 having the largest quantity of data (buffer status) in the buffer, among two logical channels, is used for reporting (as indicated by reference numeral 1930). According to an embodiment, before transmitting a buffer status report, a certain logical channel may share the RLC state information or the ACK reception situation, which has been described in FIG. 17, with other logical channels.

FIG. 20 illustrates another embodiment in which a terminal transmits an uplink buffer status report to a base station when performing packet duplication (as indicated by reference numeral 2000). In the embodiment illustrated in FIG. 20, radio bearers 1 and 2 do not perform packet duplication, and are mapped to logical channels #1 and #2, respectively. However, it is assumed that packet duplication is configured for a radio bearer #3 so that the radio bearer #3 is mapped to logical channel #3 2010 and logical channel #4 2020. A buffer status report is transmitted based on the buffer status of each logical channel. Therefore, a logical channel for which packet duplication is performed at the time point of transmitting the buffer status report is required to determine what buffer status to report.

In the embodiment illustrated in FIG. 20, for logical channels #1 and #2, packet duplication is not performed and the corresponding buffer status is used as it is. However, with regard to logical channels #3 and #4 2010 and 2020, only the buffer status of logical channel #4 2020 which has been configured as a primary logical channel is reported (as indicated by reference numeral 2030). Alternatively, the terminal may arbitrarily select a logical channel or may inform the base station which logical channel is used for a buffer status report. According to an embodiment, a certain logical channel may share the RLC state information or the ACK reception status, which has been described in the description of FIG. 17, with other logical channels before transmitting a buffer status report.

FIG. 21 illustrates an embodiment in which a terminal transmits a uplink buffer status report to a base station when performing packet duplication (as indicated by reference numeral 2100). In the embodiment illustrated in FIG. 21, radio bearers 1 and 2 do not perform packet duplication and are mapped to logical channels #1 and #2, respectively. However, it is assumed that packet duplication is configured for a radio bearer #3, and the radio bearer #3 is mapped to logical channel #3 2110 and logical channel #4 2120. The buffer status report is performed on the basis of the buffer status of each logical channel. Therefore, it is required that a logical channel for which packet duplication is performed at the time of transmitting the buffer status report is required to determine what buffer status to report.

In the embodiment illustrated in FIG. 21, for logical channels #1 and #2, packet duplication is not performed and the corresponding buffer status is used as it is. However, for logical channels #3 and #4 2110 and 2120, a buffer status report message is generated using the buffer status of each logical channel as it is (as indicated by reference numeral 2130). According to an embodiment, a certain logical channel may share the RLC state information or the ACK reception status, which has been described in the description of FIG. 17, with other logical channels before transmitting a buffer status report.

Figure 22:
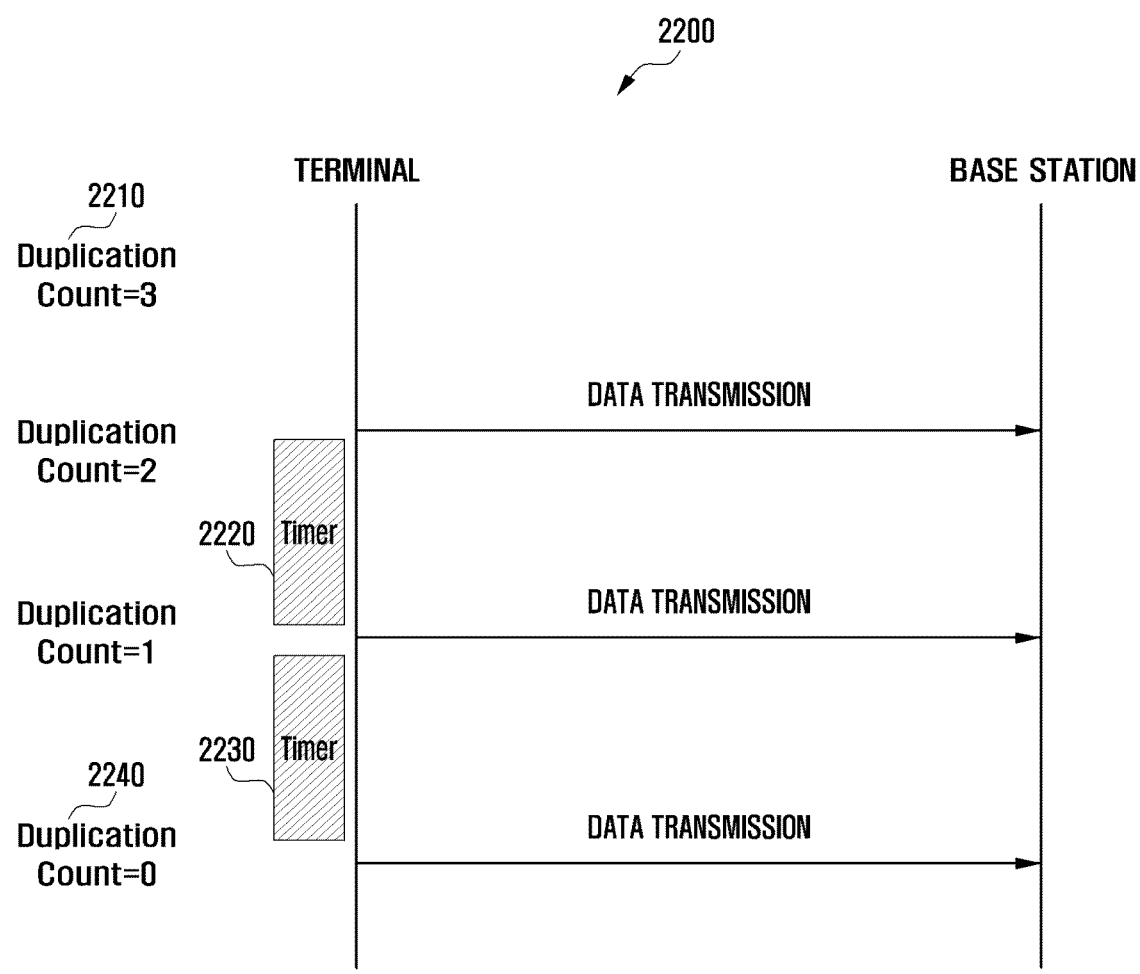
FIG. 22 illustrates application of the number of times of packet duplication according to an embodiment of the disclosure.

FIG. 22 illustrates an embodiment to which the number of times of packet duplication is applied when packet duplication is performed (as indicated by reference numeral 2200). Packet duplication may be performed by applying the NumberOfDuplication having been described in FIG. 9. The NumberOfDuplication field refers to applying the number (or the number of times) of packet duplications to a logical channel. Here, since too early transmission after performing packet duplication may lower the efficiency of the packet duplication, transmission is required to be performed at an interval. In the embodiment illustrated in FIG. 22, the NumberOfDuplication value is configured as 3, so that at the first transmission of a packet, the first transmission may be started with the Duplication Count configured as 3, which is the NumberOfDuplication value (as indicated by reference numeral 2210). Thereafter, the copied packet may be transmitted after a previously configured timer value, and the duplication count may be lowered to 2. Similarly, an operation may be performed such that a copied packet may be transmitted after a predetermined timer value 2220 so as to lower the Duplication Count to 1. When the Duplication Count is changed to 0, no further transmission of a copied packet is performed (as indicated by reference numeral 2240).

Here, the transmission of the copied packet may be performed through different logical channels or different HARQ apparatuses.

Figure 23:
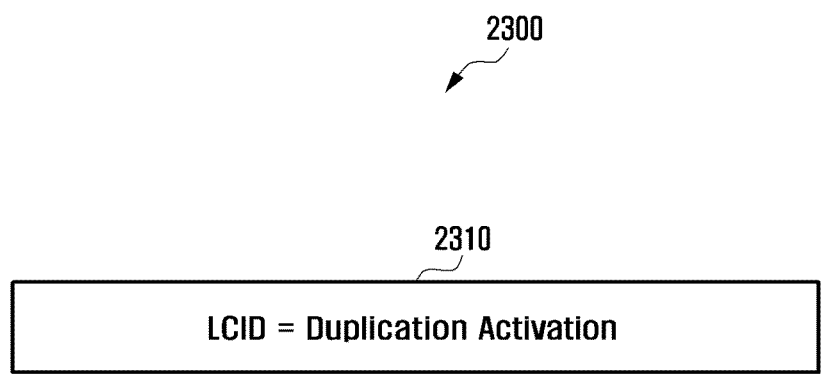
FIG. 23 illustrates a format of a packet duplication activation message according to an embodiment of the disclosure.

FIG. 23 illustrates an embodiment related to the format of the duplication activation message having been defined in FIGS. 11 and 12 (as indicated by reference numeral 2300). Here, a duplication activation message 2310 may be transmitted in a MAC control element (CE) format. Further, an indication that the message is a duplication activation message may be included in a logical channel ID (LCID) part of the transmitted MAC CE. Alternatively, if the message includes an ID field in addition to the LCID, an indication that the message is a duplication activation message may be included in the ID field. Alternatively, a particular message may include an indication that the message is a duplication activation message, and such a message may be transmitted in a DCI format.

Figure 24:
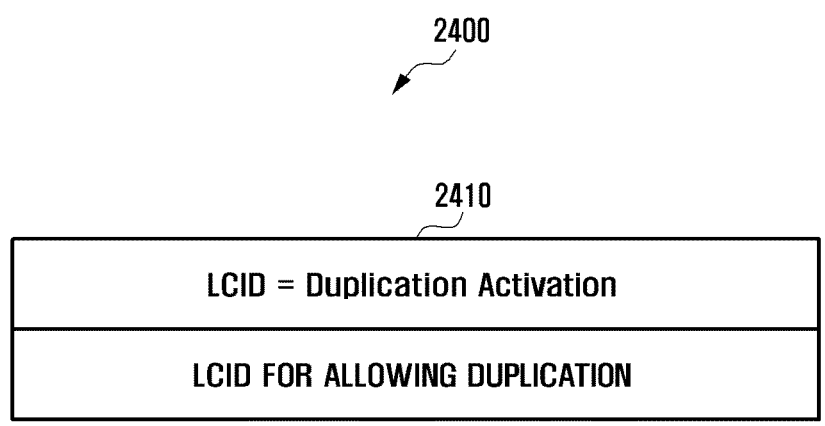
FIG. 24 illustrates another format of a packet duplication activation message according to an embodiment of the disclosure.

FIG. 24 illustrates an embodiment related to the format of the duplication activation message having been defined in FIGS. 11 and 12 (as indicated by reference numeral 2400). Here, the duplication activation message 2410 may be transmitted in a MAC control element (CE) format. Further, an indication that the message is a duplication activation message may be included in a logical channel ID (LCID) part of the transmitted MAC CE. Alternatively, if the message includes an ID field in addition to the LCID, an indication that the message is a duplication activation message may be included in the ID field. Alternatively, a particular message may include an indication that the message is a duplication activation message. Alternatively, a duplication activation message 2410 may be transmitted by adding the ID of a logical channel that allows packet duplication to a radio bearer. In addition, such a message may also be transmitted in a DCI format.

Figure 25:
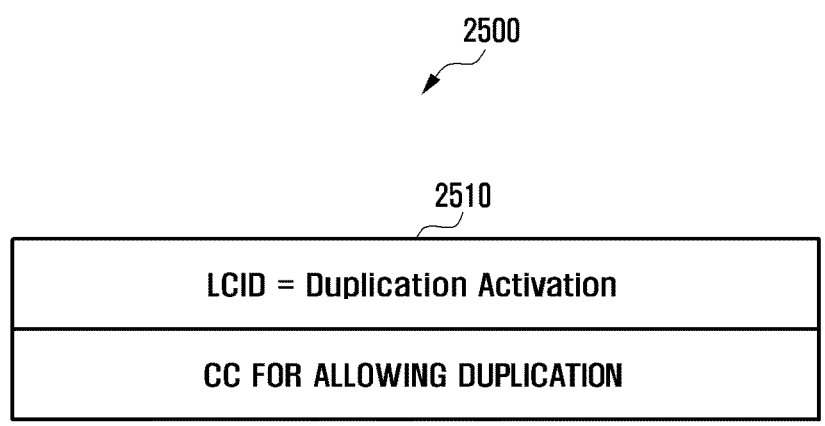
FIG. 25 illustrates another format of a packet duplication activation message according to an embodiment of the disclosure.

FIG. 25 illustrates an embodiment related to the format of the duplication activation message having been defined in FIGS. 11 and 12 (as indicated by reference numeral 2500). Here, a duplication activation message 2510 may be transmitted in a MAC control element (CE) format. Further, an indication that the message is a duplication activation message may be included in a logical channel ID (LCID) part of the transmitted MAC CE. Alternatively, if the message includes an ID field in addition to the LCID, an indication that the message is a duplication activation message may be included in the ID field. Alternatively, a particular message may include an indication that the message is a duplication activation message. Alternatively, CC information that allows packet duplication may be included therein and transmitted to a radio bearer. At this time, packet duplication may be performed in away of activating a logical channel enabling transmission through the corresponding CC (or a logical channel mapped to the corresponding CC). In addition, such a message may also be transmitted in a DCI format.

Figure 26:
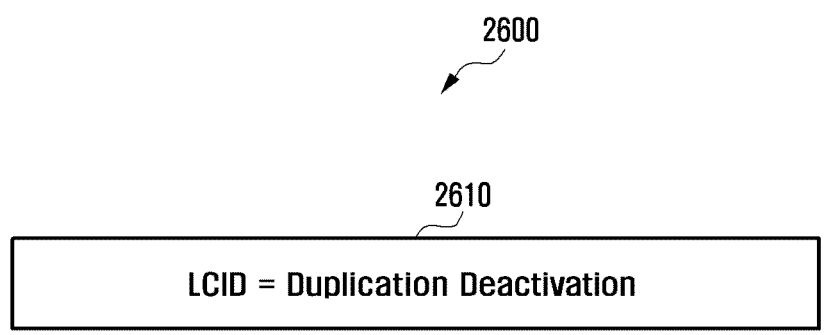
FIG. 26 illustrates a format of a packet duplication deactivation message according to an embodiment of the disclosure.

FIG. 26 illustrates an embodiment related to the format of the duplication deactivation message having been defined in FIGS. 11 and 12 (as indicated by reference numeral 2600). Here, a duplication deactivation message 2610 may be transmitted in a MAC control element (CE) format. Further, an indication that the message is a duplication deactivation message may be included in a logical channel ID (LCID) part of the transmitted MAC CE. Alternatively, if the message includes an ID field in addition to the LCID, an indication that the message is a duplication deactivation message may be included in the ID field. Alternatively, a particular message may include an indication that the message is a duplication activation message, and such a message may be transmitted in a DCI format.

Figure 27:
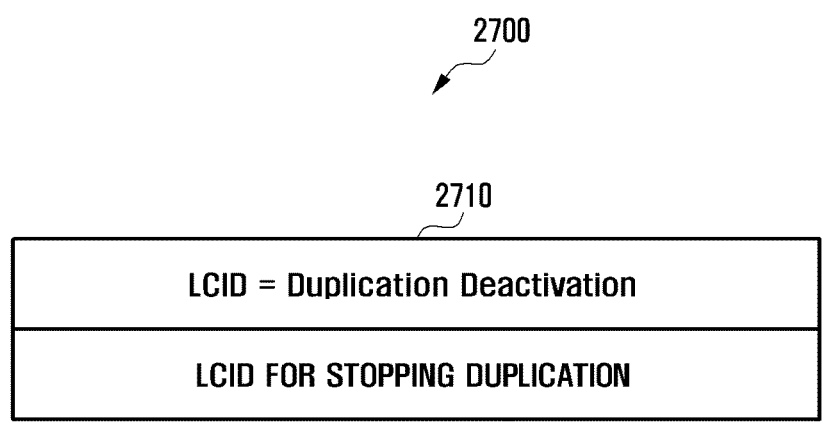
FIG. 27 illustrates another format of a packet duplication deactivation message according to an embodiment of the disclosure.

FIG. 27 illustrates an embodiment related to the format of the duplication deactivation message having been defined in FIGS. 11 and 12 (as indicated by reference numeral 2700). Here, a duplication deactivation message 2710 may be transmitted in a MAC control element (CE) format. Further, an indication that the message is a duplication deactivation message may be included in a logical channel ID (LCID) part of the transmitted MAC CE. Alternatively, if the message includes an ID field in addition to the LCID, an indication that the message is a duplication deactivation message may be included in the ID field. Alternatively, a particular message may include an indication that the message is a duplication deactivation message to a particular message. Further, a duplication deactivation message 2710 may be transmitted in a state where the ID of a logical channel for stopping packet duplication is added to a radio bearer. In addition, such a message may also be transmitted in a DCI format.

Figure 28:
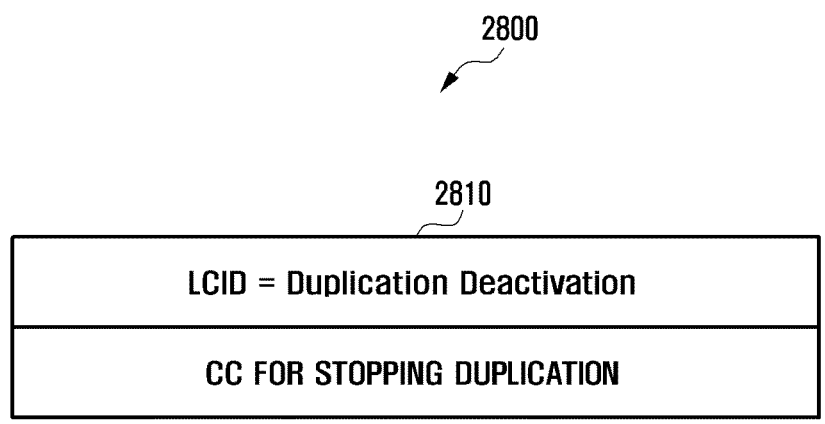
FIG. 28 illustrates another format of a packet duplication deactivation message according to an embodiment of the disclosure.

FIG. 28 illustrates an embodiment related to the format of a duplication deactivation message having been defined in FIGS. 11 and 12 (indicated by reference numeral 2800). Here, a duplication deactivation message 2810 may be transmitted in a MAC control element (CE) format. Further, an indication that the message is a duplication deactivation message may be included in a logical channel ID (LCID) part of the transmitted MAC CE. Alternatively, if the message includes an ID field in addition to the LCID, an indication that the message is a duplication deactivation message may be included in the ID field. Alternatively, a particular message may include an indication that the message is a duplication deactivation message. Further, CC information for stopping packet duplication may be included in the message and transmitted to a radio bearer. At this time, packet duplication may be stopped in a way of deactivating a logical channel enabling transmission through the corresponding CC (or a logical channel mapped to the corresponding CC). In addition, such a message may also be transmitted in a DCI format.

Figure 29:
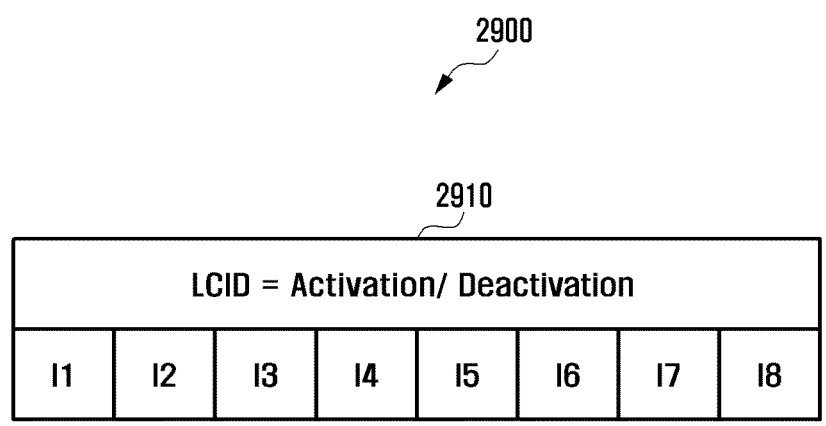
FIG. 29 illustrates another format of a packet duplication activation/deactivation message according to an embodiment of the disclosure.

FIG. 29 is a diagram illustrating another format of a packet duplication activation/deactivation message according to an embodiment of the disclosure (as indicated by reference numeral 2900). In FIG. 29, a duplication activation/deactivation message 2910 may be transmitted in a MAC CE format. Further, an indication that the message is a duplication activation/deactivation message may be included in a logical channel ID (LCID) part of the transmitted MAC CE. Meanwhile, FIG. 29 illustrates an embodiment in which packet duplication is on-off, or activated or deactivated on the basis of a duplication index. That is, as illustrated in FIG. 29, the duplication activation/deactivation message 2910 may include duplication indices of I1, I2, . . . , and I8, and each of duplication indices may have a value of 1 (activation) or 0 (deactivation), and the meaning indicated by values 1 and 0 may be configured to the opposite thereof. As described above, packet duplication is activated or deactivated on the basis of the bitmap of the duplication index, so that activation/deactivation of packet duplication is enabled with respect to a plurality of radio bearers/logical channels/CCs.

Figure 30:
FIG. 30 illustrates a radio bearer configuration message for packet duplication according to another embodiment of the disclosure.

FIG. 30 illustrates a diagram of a radio bearer configuration message for packet duplication according to another embodiment of the disclosure (as indicated by reference numeral 3000). In the radio bearer configuration message illustrated in FIG. 30, the duplication index is allocated to each duplication radio bearer. In this case, if the duplication index value described in FIG. 29 is configured as 1 to indicate activation, packet duplication of the corresponding duplication radio bearer is activated.

Figure 31:
FIG. 31 illustrates a radio bearer configuration message for packet duplication according to still another embodiment of the disclosure.

FIG. 31 illustrates a diagram of a radio bearer configuration message for packet duplication according to another embodiment of the disclosure (as indicated by reference numeral 3100). In the radio bearer configuration message illustrated in FIG. 30, the duplication index is allocated to each logical channel. In this case, if the duplication index value described in FIG. 29 is configured as 1 to indicate activation, packet duplication of the corresponding logical channel is activated. On the other hand, if the duplication index value is configured as 0 to indicate deactivation, packet duplication of the corresponding logical channel is deactivated.

Figure 32:
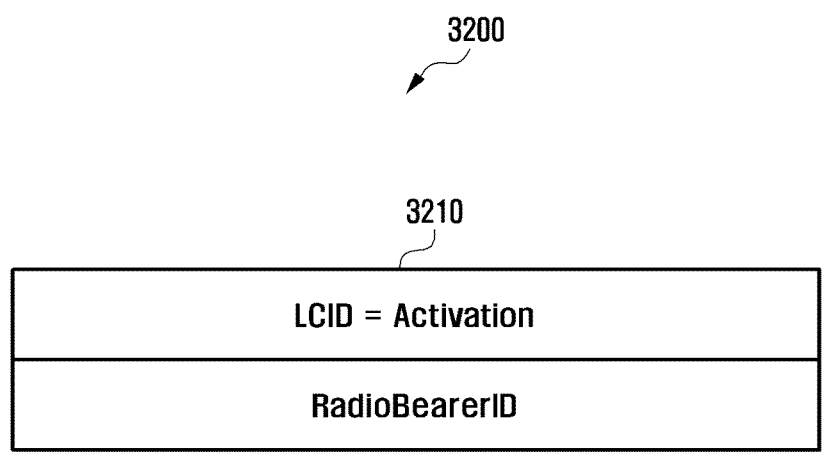
FIG. 32 illustrates another format of a packet duplication activation message according to an embodiment of the disclosure.

FIG. 32 illustrates a diagram of another format of a packet duplication activation message according to another embodiment of the disclosure (as indicated by reference numeral 3200). Here, a duplication activation message 3210 may be transmitted in a MAC control element (CE) format. Further, an indication that the message is a duplication activation message may be included in a logical channel ID (LCID) part of the transmitted MAC CE. Alternatively, if the message includes an ID field in addition to the LCID, an indication that the message is a duplication activation message may be included in the ID field. Alternatively, a particular message may include an indication that the message is a duplication activation message. In addition, IDs of radio bearers for which packet duplication is allowed may also be individually included in the duplication activation message, and then transmitted. Here, packet duplication may be performed on a data packet transmitted through the corresponding radio bearer. In addition, such a message may also be transmitted in a DCI format.

Figure 33:
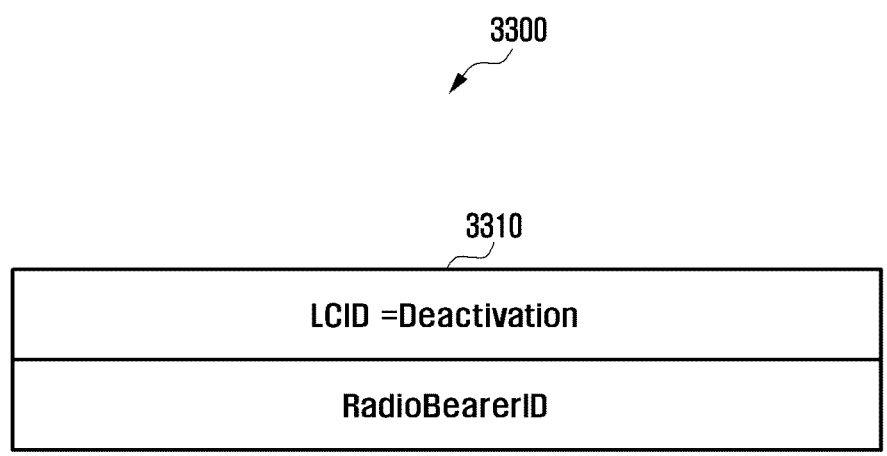
FIG. 33 illustrates another format of a packet duplication deactivation message according to an embodiment of the disclosure.

FIG. 33 illustrates a diagram of another format of a packet duplication deactivation message according to an embodiment of the disclosure (as indicated by reference numeral 3300). Here, a duplication deactivation message 3310 may be transmitted in a MAC control element (CE) format. Further, an indication that the message is a duplication deactivation message may be included in a logical channel ID (LCID) part of the transmitted MAC CE. Alternatively, if the message includes an ID field in addition to the LCID, an indication that the message is a duplication deactivation message may be included in the ID field. Alternatively, a particular message may include an indication that the message is a duplication deactivation message. In addition, IDs of radio bearers for which packet duplication is stopped may also be individually included in the duplication deactivation message, and then transmitted. Here, packet duplication may be stopped/discontinued on a data packet transmitted through the corresponding radio bearer.

In addition, such a message may also be transmitted in a DCI format.

Figure 34:
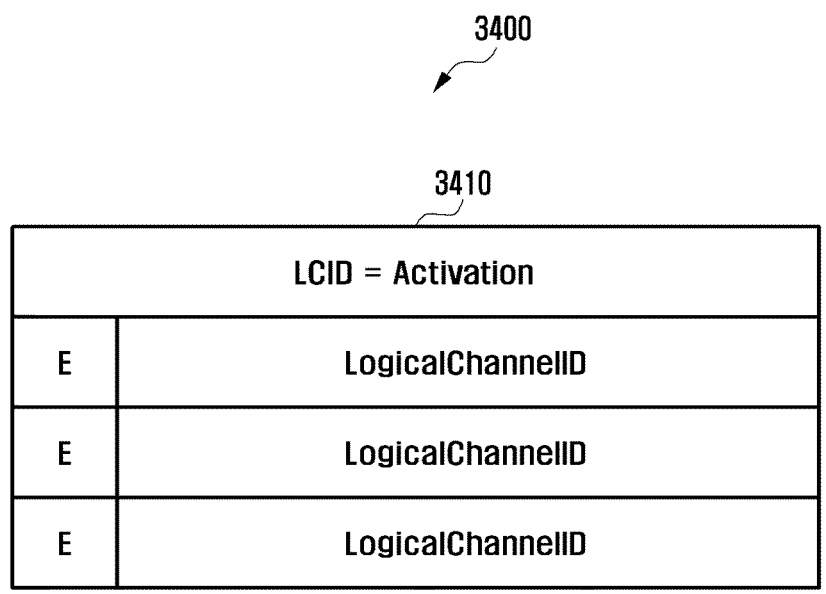
FIG. 34 illustrates another format of a packet duplication activation message according to an embodiment of the disclosure.

FIG. 34 illustrates a diagram of another format of a packet duplication activation message according to an embodiment of the disclosure (as indicated by reference numeral 3400). Here, a duplication activation message 3410 may be transmitted in a MAC control element (CE) format. Further, an indication that the message is a duplication activation message may be included in a logical channel ID (LCID) part of the transmitted MAC CE. Alternatively, if the message includes an ID field in addition to the LCID, an indication that the message is a duplication activation message may be included in the ID field. Alternatively, a particular message may include an indication that the message is a duplication activation message. In addition, the transmitted duplication activation message may include a plurality of logical channel IDs and an E field for each logical channel ID. When a specific E field has a value of 1 (or 0), the logic channel ID corresponding to the corresponding E field may be added to the next byte. In the present embodiment, a radio bearer ID instead of a plurality of logical channel IDs may be included in the duplication activation message. In addition, such a message may also be transmitted in a DCI format.

Figure 35:
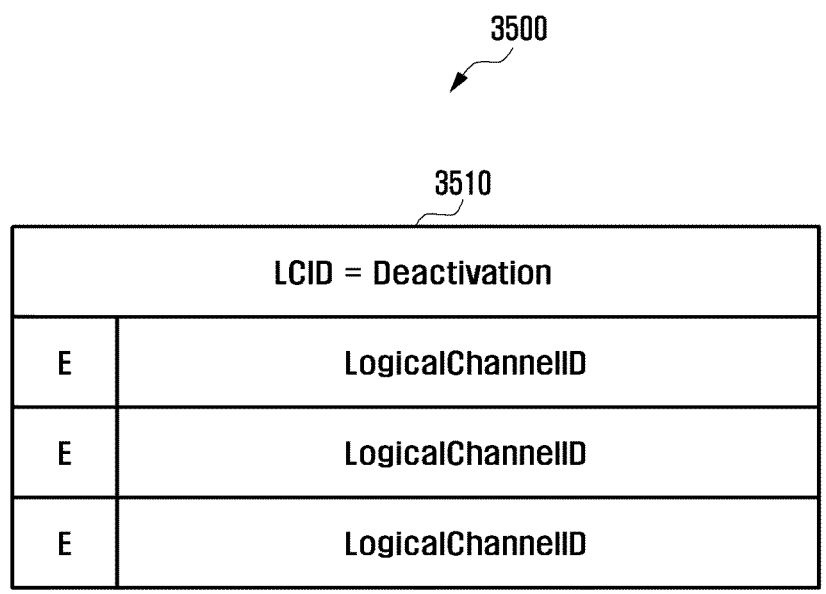
FIG. 35 illustrates another format of a packet duplication deactivation message according to an embodiment of the disclosure.

FIG. 35 illustrates a diagram of another format of a packet duplication deactivation message according to an embodiment of the disclosure (as indicated by reference numeral 3500). Here, a duplication deactivation message 3510 may be transmitted in a MAC control element (CE) format. Further, an indication that the message is a duplication deactivation message may be included in a logical channel ID (LCID) part of the transmitted MAC CE. Alternatively, if the message includes an ID field in addition to the LCID, an indication that the message is a duplication deactivation message may be included in the ID field. Alternatively, a particular message may include an indication that the message is a duplication deactivation message. In addition, the transmitted duplication deactivation message may include a plurality of logical channel IDs and an E field for each logical channel ID. When a specific E field has a value of 1 (or 0), the logic channel ID corresponding to the corresponding E field may be added to the next byte. In the present embodiment, a radio bearer ID instead of a plurality of logical channel IDs may be included in the duplication deactivation message. In addition, such a message may also be transmitted in a DCI format.

Figure 36:
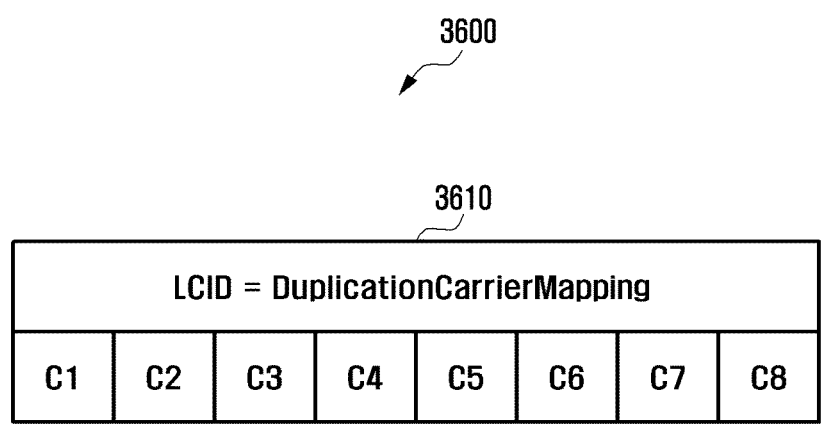
FIG. 36 illustrates a format of a message for dynamically changing a mapping relationship between a logical channel and a CC according to an embodiment of the disclosure.

FIG. 36 illustrates a diagram of a format of a message dynamically changing a mapping relationship between a logical channel and a CC according to an embodiment of the disclosure (as indicated by reference numeral 3600). Here, a duplication carrier mapping message 3610 may be transmitted in a MAC control element (CE) format. Further, an indication that the message is a duplication carrier mapping message may be included in a logical channel ID (LCID) part of the transmitted MAC CE. Alternatively, if the message includes an ID field in addition to the LCID, an indication that the message is a duplication carrier mapping message may be included in the ID field. Alternatively, a particular message may include an indication that the message is a duplication carrier mapping message.

Meanwhile, the duplication carrier mapping message 3610 is a message for dynamically changing the mapping between a logical channel in which packet duplication is performed and a carrier, and as illustrated in FIG. 36, the duplication carrier mapping massage may include the Ci value (i=1, 2, 3, . . . ) for each of a plurality of CCs. It is indicated that when the Ci value is 0, the corresponding CC is used in a primary logical channel, and when the Ci value is 1, the corresponding CC is used in the secondary logical channel. A terminal may change mapping between the logical channel and the CC by receiving the duplication carrier mapping message 3610 of FIG. 36. However, even if the mapping between the logical channel and the CC is changed, an ongoing retransmission (e.g., HARQ) operation in a specific logical channel may proceed as it is.

Figure 37:
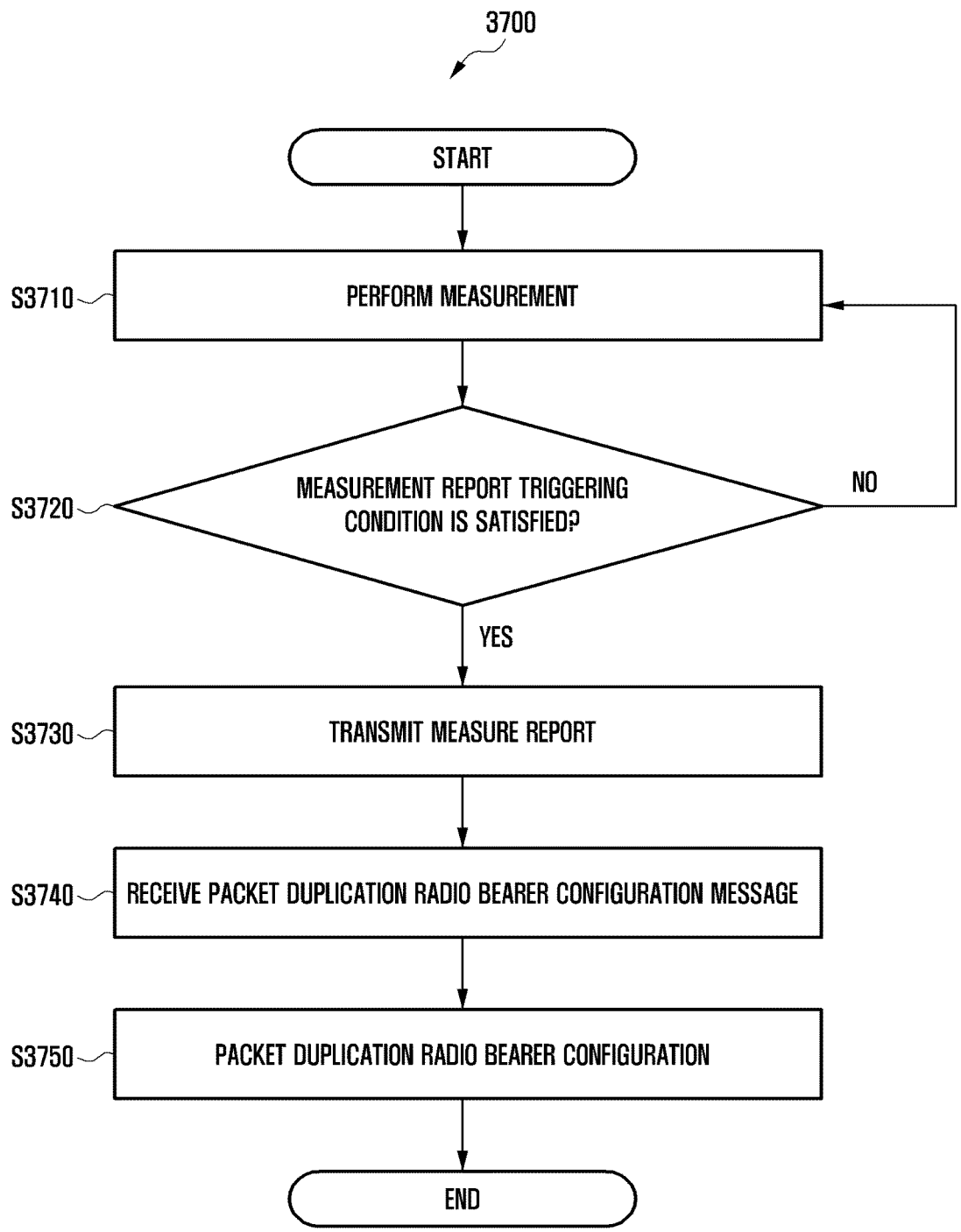
FIG. 37 illustrates a procedure of starting configuration of packet duplication according to an embodiment of the disclosure.

FIG. 37 illustrates an embodiment of a procedure in which configuration of packet duplication is started (as indicated by reference numeral 3700). In the embodiment illustrated in FIG. 37, a terminal determines whether a triggering condition of a measurement report previously configured is satisfied, and measures a reference signal (RS) or the like (S3710). Here, if the measured value satisfies the triggering condition (S3720), the terminal transmits a measurement report message to a base station (S3730), and based on this, the base station instructs the configuration of a radio bearer that performs packet duplication (S3740). Such a configuration may be the message format of FIG. 9, and some of the fields included in FIG. 9 may be applied thereto. Upon reception of the message, the terminal and the base station may configure a radio bearer that performs packet duplication (S3750). The format of the bearer may be one of the formats described in FIG. 3 to FIG. 8.

Figure 38:
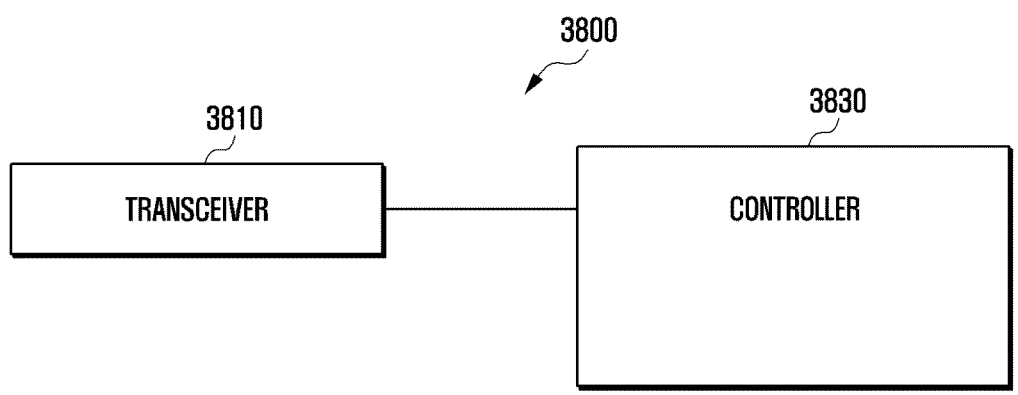
FIG. 38 illustrates a terminal according to an embodiment of the disclosure.

FIG. 38 illustrates a diagram of a terminal according to an embodiment of the disclosure (as indicated by reference numeral 3800).

Referring to FIG. 38, the terminal 3800 may include a transceiver 3810 and a controller 3830. The controller 3830 may include at least one processor. The transceiver 3810 and the controller 3830 may be electrically connected to each other. The controller 3830 may control the transceiver 3810 to transmit or receive a signal. The transmission and/or reception of signals, information, messages, and the like by the controller 3830 may be interpreted such that the controller 3830 controls the transceiver 3810 so as to transmit and/or receive signals, information, messages, and the like.

The terminal 3800 may transmit and/or receive signals through the transceiver 3810.

The controller 3830 may control the overall operation of the terminal 3800. In addition, the controller 3830 may control the operation of a terminal having been described through FIG. 1 to FIG. 37.

Figure 39:
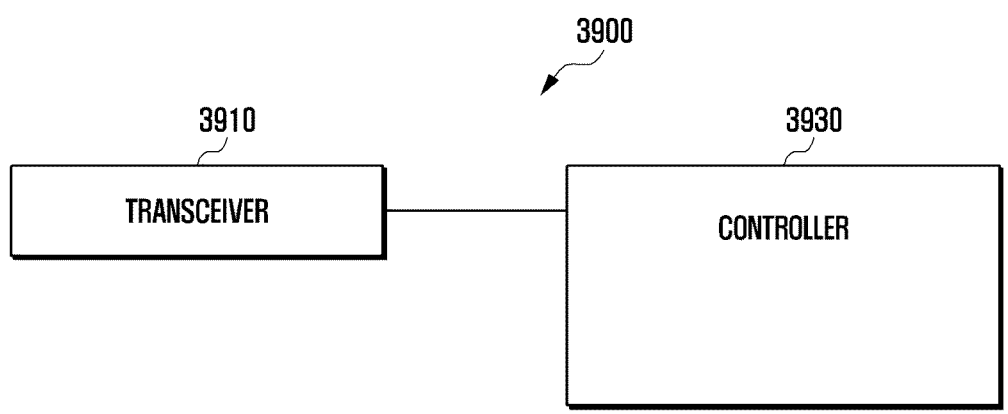
FIG. 39 illustrates a base station according to an embodiment of the disclosure.

FIG. 39 illustrates a diagram of a base station according to an embodiment of the disclosure (as indicated by reference numeral 3900).

Referring to FIG. 39, a base station 3900 may include a transceiver 3910 and a controller 3930. The controller 3930 may include at least one processor. The transceiver 3910 and the controller 3930 may be electrically connected to each other. The controller 3930 may control the transceiver 3910 to transmit or receive signals. The transmission and/or reception of signals, information, messages, and the like by the controller 3930 may be interpreted such that the controller 3930 controls the transceiver 3910 so as to transmit and/or receive signals, information, messages, and the like.

The base station 3900 may transmit and/or receive signals through the transceiver 3910. The controller 3930 may control the overall operation of the base station 3900. In addition, the controller 3930 may control the operation of a base station having been described through FIG. 1 to FIG. 37.

Figure 40:
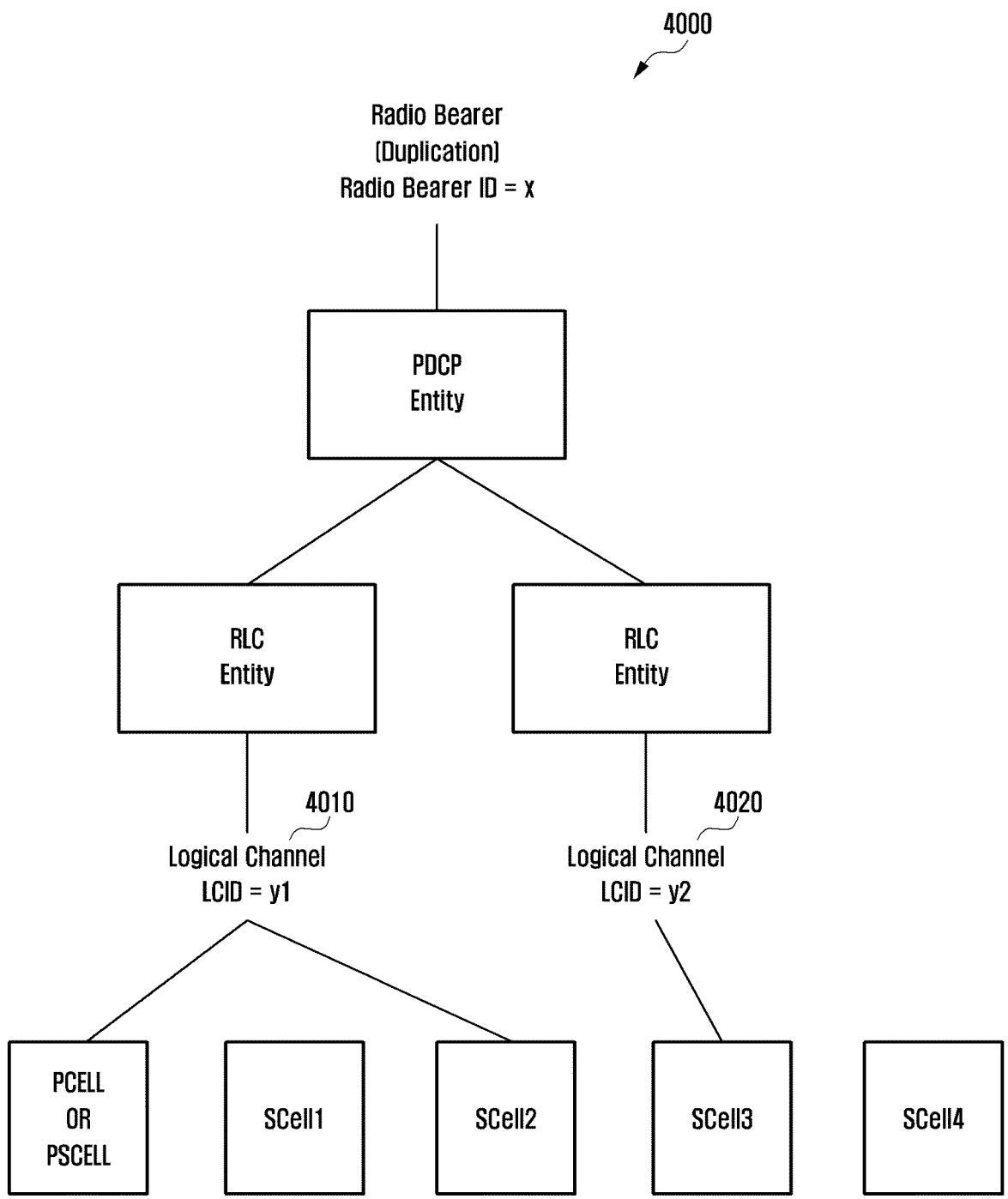
FIG. 40 illustrates determination of a bearer structure and a primary logical channel for packet duplication according to an embodiment of the disclosure.

FIG. 40 illustrates an embodiment of a bearer structure for packet duplication (as indicated by reference numeral 4000). In the embodiment illustrated in FIG. 40, one radio bearer is configured to allow packet duplication and a radio bearer ID value is configured as x. Generally, one or more signaling radio bearers (SRB) and data radio bearers may be provided between a base station and a terminal. In the embodiment illustrated in FIG. 40, it is illustrated that the PDCP apparatus (or, entity) of a radio bearer copies a PDCP protocol data unit (PDU), and then transmits the copied PDCP PDUs to different RLC apparatuses respectively, so as to perform processing thereof. RLC apparatuses are mapped to logical channels, respectively. In the embodiment illustrated in FIG. 40, each logical channel ID is denoted by y1 4010 and y2 4020.

Here, mapping with a cell is required for efficient packet transmission. In other words, by mapping a logical channel and a cell, it is possible to specify a limit for a cell that can transmit specific logical channel data. Such a cell may be replaced by a component carrier (CC), a band width part (BWP), or the like. In the embodiment illustrated in FIG. 40, a logical channel 4010 having logical channel ID y1 is mapped to PCell (or PSCell, or having PSCell for a secondary cell group) and SCell 2, and a logical channel 4020 having logical channel ID y2 is mapped to SCell 3. As described above, a logical channel and a cell are mapped to each other, so that it is possible to prevent data packets copied through packet duplication from being transmitted to the same cell (or the same CC, the same BWP) even if the data packets are subjected to a multiplexing process in the MAC apparatus (entity). In other words, two or more copied data packets are not included in the same MAC PDU, and the original PDCP PDU and the copied PDCP PDU are not transmitted in the same transmission block.

Here, with regard to a bearer for which packet duplication is allowed, a primary logical channel and a secondary logical channel, which have been described in FIGS. 5, 6, 9, 30, 31, and the like, may be configured. The primary logical channel always transmits/receives packets regardless of the activation of packet duplication. However, the secondary logical channel transmits/receives packets only when packet duplication is activated. That is, when packet duplication is activated, the same PDCP PDU is transmitted through the primary logical channel and the secondary logical channel, respectively. Here, the PDCP PDU having been transmitted through the primary logical channel and the secondary logical channel may be referred to as an original PDCP PDU and a copied PDCP PDU, respectively. When packet duplication is deactivated, the PDCP PDU is transmitted through the primary logical channel only. When packet duplication is deactivated, an RLC apparatus of a secondary logical channel may be re-established. Whether a specific logical channel is a primary logical channel or a secondary logical channel may be designated by a base station, based on the RRC configuration or the like, but it is possible to define rules for the determination when the configuration thereof is not required. In a packet duplication structure, the primary logical channel may be determined using one of the following rules.

A logical channel having a small logical channel ID value is determined as a primary logical channel. If there are three or more logical channels, a logical channel having the smallest logical channel ID is determined as a primary logical channel. The remaining logical channels are determined as secondary logical channels.

A logical channel having a large logical channel ID is determined as a primary logical channel. If there are three or more logical channels, a logical channel having the largest logical channel ID is determined as a primary logical channel. The remaining logical channels are determined as secondary logical channels.

A logical channel having a PCell among cells having been mapped to logical channels is determined as a primary logical channel. The remaining logical channels are determined as secondary logical channels.

A logical channel having a PCell or a PSCell among the cells having been mapped to logical channels is determined as a primary logical channel. The remaining logical channels are determined as secondary logical channels.

A logical channel having a PCell or a PSCell among cells having been mapped to logical channels is determined as a primary logical channel. If the primary logical channel is not determined by the above rules, a logical channel, of which the minimum SCell index value of an SCell among SCells mapped to the logical channel is smaller than the minimum SCell index values of the other logical channels, is determined as the primary logical channel. The remaining logical channels are determined as secondary logical channels.

A logical channel having a PCell or a PSCell among cells having been mapped to logical channels is determined as a primary logical channel. If the primary logical channel is not determined by the above rules, a logical channel, of which the maximum SCell index value of an SCell among SCells mapped to the logical channel is larger than the maximum SCell index values of the other logical channels, is determined as the primary logical channel. The remaining logical channels are determined as secondary logical channels.

Figure 41:
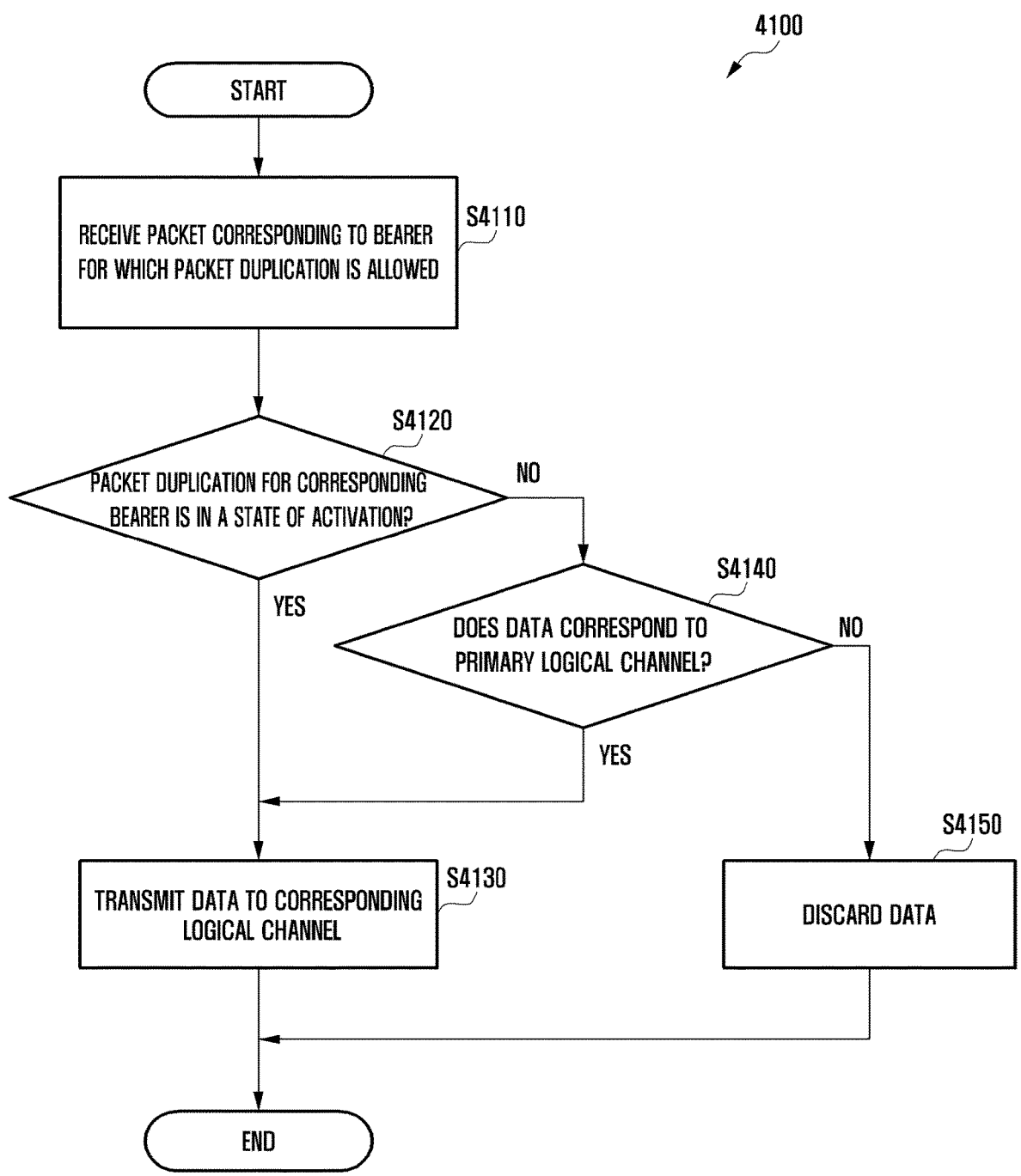
FIG. 41 illustrates an operation of a receiver according to an embodiment of the disclosure.

FIG. 41 illustrates a procedure of processing when a packet corresponding to a bearer for which packet duplication is allowed is received (as indicated by reference numeral 4100). When a packet is received (S4110), if packet duplication is in a state of activation, a receiver transmits the packet to the corresponding logical channel so as to perform processing thereof (S4120, S4130). If packet duplication is in a state of deactivation, the receiver may determine whether the packet corresponds to primary logical channel (S4120, S4140), and if the packet is a primary logical channel, the receiver transmits the packet to the corresponding logical channel and performs processing thereof (S4130). Otherwise, the packet may be determined as a packet of a secondary logical channel, and the packet is discarded and is not transmitted through the logical channel (S4150).

Figure 42:
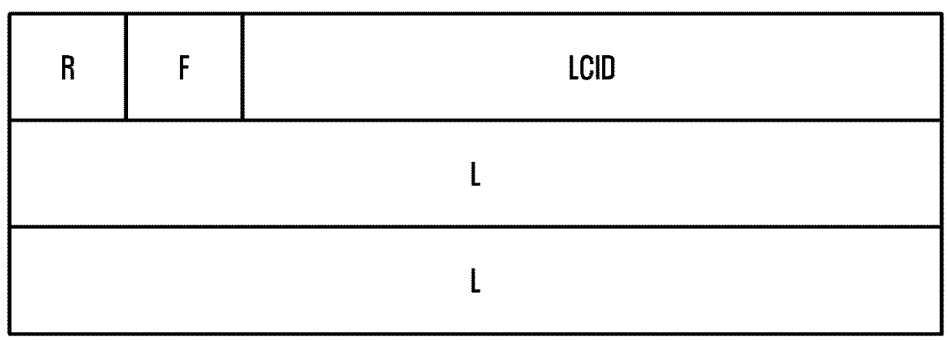
FIG. 42 illustrates a format of a subheader according to an embodiment of the disclosure.

FIG. 42 illustrates a MAC subheader format (as indicated by reference numeral 4200).

The MAC subheader informs of information of a MAC layer data referred to as a MAC service data unit (SDU). The MAC subheader may include reserved (R), format (F), logical channel ID (LCID), length (L) fields, and the like. The R field is a reserved field and is typically configured as zero, which is a default value. The F field indicates the length of the L field. The LCID field indicates the logical channel ID of data (MAC SDU). The L field indicates the length of the MAC SDU. Generally, the above value should be configured as a correct value, and if an unconfigured value (unused value, invalid value) is configured, it may be considered that there is a packet failure. For example, if the R field is configured as 1, it may be processed as an unused value.

Figure 43:
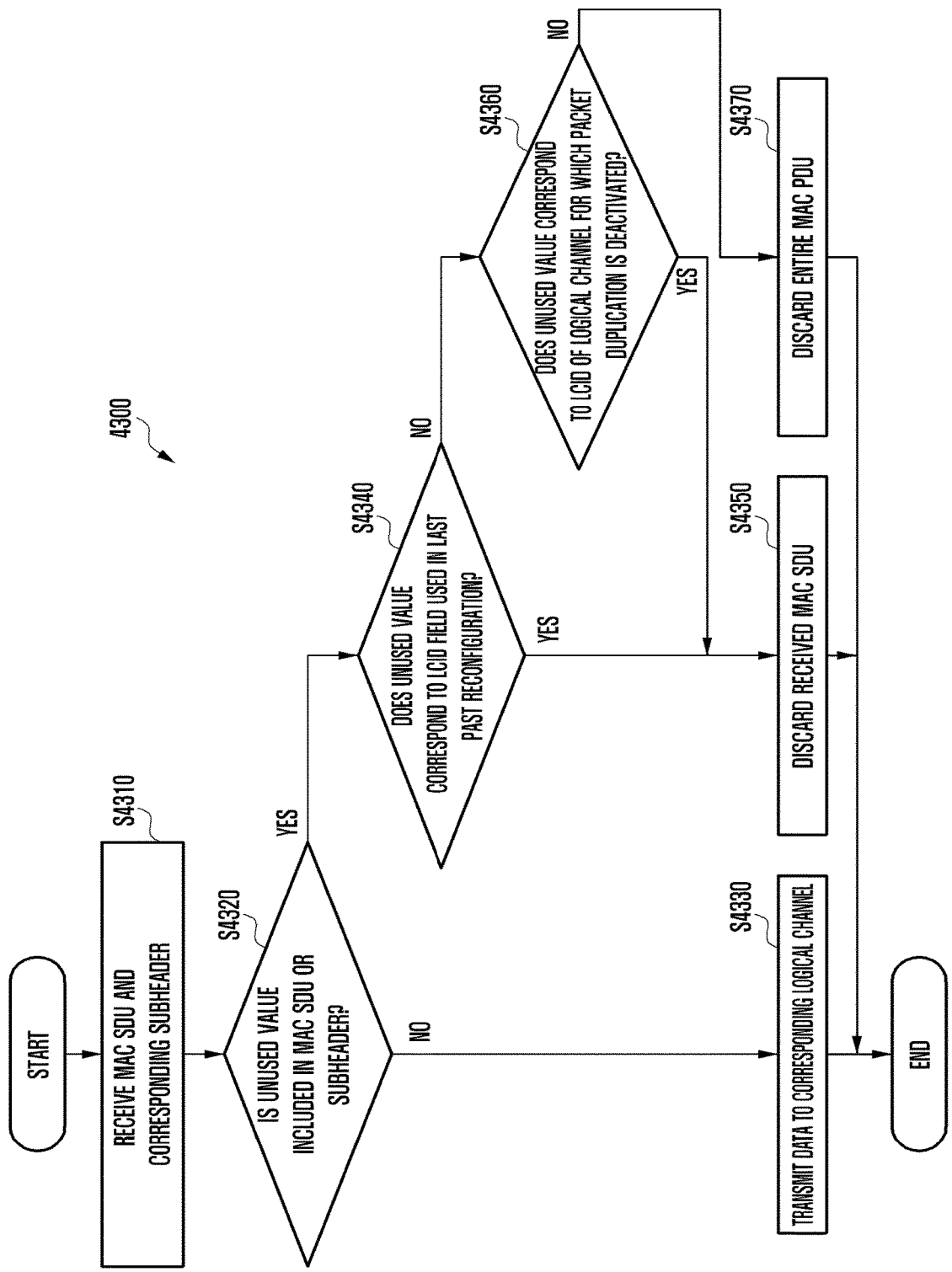
FIG. 43 illustrates an operation of a receiver according to an embodiment of the disclosure.

FIG. 43 illustrates a procedure of, upon receiving a packet, processing by a receiver (as indicated by reference numeral 4300). FIG. 43 illustrates an embodiment in which, upon receiving an MAC PDU, a process is performed by a MAC apparatus (MAC Entity). The received MAC PDU may include a MAC SDU (S4310). Here, the MAC PDU may include at least one unused value. At this time, an SDU or subheader including the corresponding value therein may be identified. If the SDU may not be correctly identified, the entire received MAC PDU may be discarded. Otherwise, if identification of the MAC SDU is enabled, it is checked whether an unused value is included in the MAC SDU or the subheader. If there is no unused value, data (SDU) is transmitted through a corresponding logical channel so as to perform processing of packets (S4320, S4330). If an unused value is included, it is required to check whether this value corresponds to the LCID field used in the last RRC reconfiguration (reconfiguration immediately before the latest RRC reconfiguration) (S4320, S4340). If, as a result of checking, the LCID field has been used for the immediate past RRC reconfiguration, the LCIP field may be a part generated before the latest RRC reconfiguration and may not be an error having occurred in the transmission/reception process. In other words, a value used in the immediate past reconfiguration may be a value that is not used for the latest reconfiguration. In this case, only the corresponding MAC SDU may be discarded (S4350). This may happen when RRC reconfiguration occurs without MAC reset or RRC reestablishment. If an unused value is an ID of a logical channel for which packet duplication is deactivated, the unused value may be data generated when packet duplication is activated or data transmitted by a transmitter which does not recognize deactivation thereof. In case where an ID of a logical channel for which packet duplication is allowed but is deactivated is included, an operation of discarding the corresponding MAC SDU only may be performed (S4360, S4350). If an unused value other than those described above is included, the entire MAC PDU may be discarded (S4360, S4370).

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

What is claimed is:

1. A method performed by a terminal in a wireless communication system, the method comprising:
   receiving, from a base station, first information configuring a packet duplication for a radio bearer, second information on a first logical channel mapped to a first serving cell, and third information on a second logical channel mapped to a second serving cell, wherein a first radio link control (RLC) entity for the radio bearer corresponds to the first logical channel, a second RLC entity for the radio bearer corresponds to the second logical channel, and the first information is set to true;
   transmitting, to the base station, a data packet from the first RLC entity and a duplicated data packet from the second RLC entity based on the first information, wherein the data packet is transmitted on the first serving cell based on the second information and the duplicated data packet is transmitted on the second serving cell based on the third information;
   receiving, from the base station, a medium access control (MAC) control element (CE) indicating a deactivation of the packet duplication; and
   discarding all duplicated data packets in the second RLC entity for the radio bearer, based on the MAC CE.

2. The method of claim 1,
   wherein the MAC CE includes a bitmap indicating a deactivation status of packet duplication for at least one radio bearer including the radio bearer.

3. The method of claim 1,
   wherein the first logical channel is a primary logical channel and the second logical channel is a secondary logical channel, and
   wherein the primary logical channel and the secondary logical channel are associated with one MAC entity, and the first serving cell and the second serving cell are different cells.

4. The method of claim 1, further comprising:
   receiving, from the base station, fourth information on a first subcarrier spacing (SCS) allowed for the first logical channel, and fifth information on a second SCS allowed for the second logical channel,
   wherein the data packet is transmitted based on the first SCS and the duplicated data packet is transmitted based on the second SCS.

5. The method of claim 1, further comprising:
   identifying, at a packet data convergence protocol (PDCP) entity of the radio bearer configured with the packet duplication, a successful delivery of PDCP data which is confirmed by one of the first RLC entity and the second RLC entity; and
   indicating, at the PDCP entity to the other of the first RLC entity and the second RLC entity, the successful delivery of PDCP data.

6. A method performed by a base station in a wireless communication system, the method comprising:
   transmitting, to a terminal, first information configuring a packet duplication for a radio bearer, second information on a first logical channel mapped to a first serving cell, and third information on a second logical channel mapped to a second serving cell, wherein a first radio link control (RLC) entity for the radio bearer of the terminal corresponds to the first logical channel, a second RLC entity for the radio bearer of the terminal corresponds to the second logical channel, and the first information is set to true;
   receiving, from the terminal, a data packet for the first logical channel and a duplicated data packet for the second logical channel based on the first information, wherein the data packet is received on the first serving cell based on the second information and the duplicated data packet is received on the second serving cell based on the third information; and
   transmitting, to the terminal, a medium access control (MAC) control element (CE) indicating a deactivation of the packet duplication,
   wherein all duplicated data packets in the second RLC entity for the radio bearer are discarded, based on the MAC CE.

7. The method of claim 6,
   wherein the MAC CE includes a bitmap indicating a deactivation status of packet duplication for at least one radio bearer including the radio bearer.

8. The method of claim 6,
   wherein the first logical channel is a primary logical channel and the second logical channel is a secondary logical channel, and
   wherein the primary logical channel and the secondary logical channel are associated with one MAC entity, and the first serving cell and the second serving cell are different cells.

9. The method of claim 6, further comprising:
   transmitting, to the terminal, fourth information on a first subcarrier spacing (SCS) allowed for the first logical channel, and fifth information on a second SCS allowed for the second logical channel, wherein the data packet is received based on the first SCS and the duplicated data packet is received based on the second SCS.

10. A terminal in a wireless communication system, the terminal comprising:
a transceiver; and
a controller configured to:
control the transceiver to receive, from a base station, first information configuring a packet duplication for a radio bearer, second information on a first logical channel mapped to a first serving cell, and third information on a second logical channel mapped to a second serving cell, wherein a first radio link control (RLC) entity for the radio bearer corresponds to the first logical channel, a second RLC entity for the radio bearer corresponds to the second logical channel, and the first information is set to true,
control the transceiver to transmit, to the base station, a data packet from the first RLC entity and a duplicated data packet from the second RLC entity based on the first information, wherein the data packet is transmitted on the first serving cell based on the second information and the duplicated data packet is transmitted on the second serving cell based on the third information,
control the transceiver to receive, from the base station, a medium access control (MAC) control element (CE) indicating a deactivation of the packet duplication, and
discard all duplicated data packets in the second RLC entity for the radio bearer, based on the MAC CE.

11. The terminal of claim 10,
wherein the MAC CE includes a bitmap indicating a deactivation status of packet duplication for at least one radio bearer including the radio bearer.

12. The terminal of claim 10,
wherein the first logical channel is a primary logical channel and the second logical channel is a secondary logical channel, and
wherein the primary logical channel and the secondary logical channel are associated with one MAC entity, and the first serving cell and the second serving cell are different cells.

13. The terminal of claim 10,
wherein the controller is further configured to receive, from the base station, fourth information on a first subcarrier spacing (SCS) allowed for the first logical channel, and fifth information on a second SCS allowed for the second logical channel, and
wherein the data packet is transmitted based on the first SCS and the duplicated data packet is transmitted based on the second SCS.

14. The terminal of claim 10, wherein the controller is further configured to:
identify, at a packet data convergence protocol (PDCP) entity of the radio bearer configured with the packet duplication, a successful delivery of PDCP data which is confirmed by one of the first RLC entity and the second RLC entity, and
indicate, at the PDCP entity to the other of the first RLC entity and the second RLC entity, the successful delivery of PDCP data.

15. A base station in a wireless communication system, the base station comprising:
a transceiver; and
a controller configured to:
control the transceiver to transmit, to a terminal, first information configuring a packet duplication for a radio bearer, second information on a first logical channel mapped to a first serving cell, and third information on a second logical channel mapped to a second serving cell, wherein a first radio link control (RLC) entity for the radio bearer of the terminal corresponds to the first logical channel, a second RLC entity for the radio bearer of the terminal corresponds to the second logical channel, and the first information is set to true,
control the transceiver to receive, from the terminal, a data packet for the first logical channel and a duplicated data packet for the second logical channel based on the first information, wherein the data packet is received on the first serving cell based on the second information and the duplicated data packet is received on the second serving cell based on the third information, and
control the transceiver to transmit, to the terminal, a medium access control (MAC) control element (CE) indicating a deactivation of the packet duplication,
wherein all duplicated data packets in the second RLC entity for the radio bearer are discarded, based on the MAC CE.

16. The base station of claim 15,
wherein the MAC CE includes a bitmap indicating a deactivation status of packet duplication for at least one radio bearer including the radio bearer.

17. The base station of claim 15,
wherein the first logical channel is a primary logical channel and the second logical channel is a secondary logical channel, and
wherein the primary logical channel and the secondary logical channel are associated with one MAC entity, and the first serving cell and the second serving cell are different cells.

18. The base station of claim 15,
wherein the controller is further configured to control the transceiver to transmit, to the terminal, fourth information on a first subcarrier spacing (SCS) allowed for the first logical channel, and fifth information on a second SCS allowed for the second logical channel, and
wherein the data packet is received based on the first SCS and the duplicated data packet is received based on the second SCS.

* * * * *